United States Patent [19]
Nakane et al.

[11] Patent Number: 5,898,507
[45] Date of Patent: Apr. 27, 1999

[54] IMAGE PROCESSING APPARATUS

[75] Inventors: Rintaro Nakane; Hiroki Kanno, both of Yokohma, Japan

[73] Assignee: Kabushiki Kaisha Toshiba, Kawasaki, Japan

[21] Appl. No.: 08/274,305

[22] Filed: Jul. 12, 1994

[30] Foreign Application Priority Data

Jul. 16, 1993 [JP] Japan .................................... 5-176896

[51] Int. Cl.$^6$ .................................................. H04N 1/40
[52] U.S. Cl. ........................ 358/448; 358/455; 358/458; 382/252
[58] Field of Search ..................... 358/448, 455, 358/456, 458, 463, 465, 466; 382/251, 252

[56] References Cited

U.S. PATENT DOCUMENTS

| | | | |
|---|---|---|---|
| 5,107,332 | 4/1992 | Chan | 358/518 |
| 5,289,294 | 2/1994 | Fujisawa | 358/463 |
| 5,414,531 | 5/1995 | Amemiya et al. | 358/466 |

FOREIGN PATENT DOCUMENTS 58-190950  11/1983  Japan ................................ G03F 3/08

OTHER PUBLICATIONS

An Adaptive algorithm for Spatial Greyscale Robert W. Floyd and Louis Steinberg ProK SID vol. 17 (2), pp. 75–77, 1976.

*Primary Examiner*—Thomas D. Lee
*Attorney, Agent, or Firm*—Limbach & Limbach L.L.P.

[57] ABSTRACT

In an image processing apparatus of this invention, an error diffusion processing means having a multi level signal conversion means changes the conversion characteristics of the multi level signal conversion means, e.g., corrects the output value of error diffusion processing, on the basis of an output from a means for detecting a variation in toner attachment amount or image forming condition. That is, this invention executes error diffusion processing as follows when an input dimension is different from an output dimension (e.g., input dimension=reflection factor or density, output dimension=number of gradation levels) with respect to a multi-value conversion means because error diffusion processing cannot be simply performed. The input dimension is set to coincide with the output dimension (an output signal is set to coincide with the input signal), this output signal is changed in accordance with a variation in image density, and an error between the changed output signal and the input signal is calculated, thereby executing error diffusion processing. Even when the gradation characteristics per pixel vary due to the influence of a change in environment or aging, or the number of gradation levels decreases due to the variation, the gradation characteristics in a local area can be maintained good, and initial image quality can be provided over a long period of time.

24 Claims, 20 Drawing Sheets

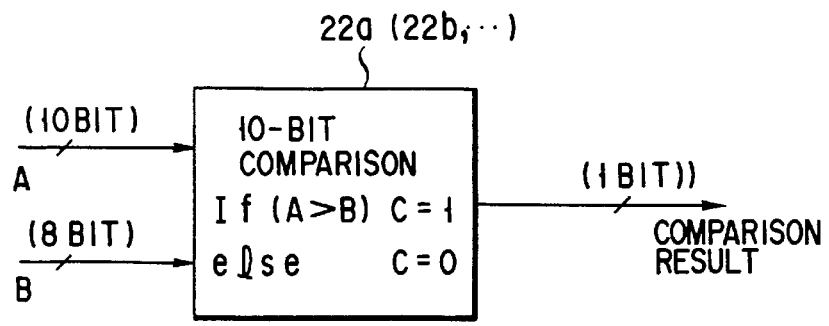
F I G. 6
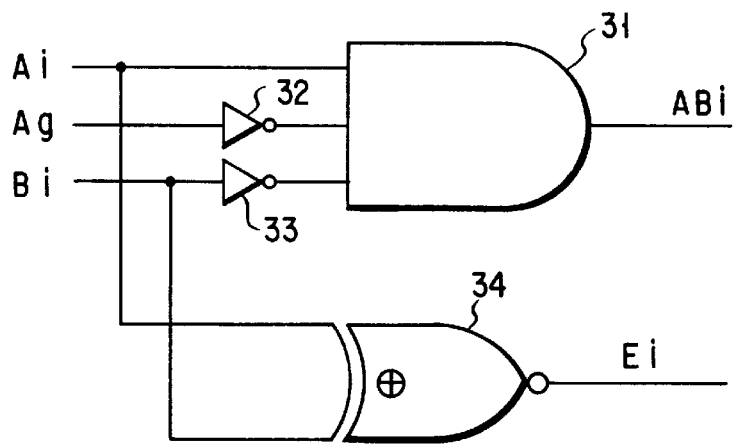
Ai ⇒ BIT i OF INPUT A
Bi ⇒ BIT i OF INPUT B
i ⇒ 0, 1, 2 ⋯, 7
A9 ⇒ SIGN BIT OF INPUT A
A9=0 ⇒ A≧0 & A9=1 ⇒ A<0
F I G. 7

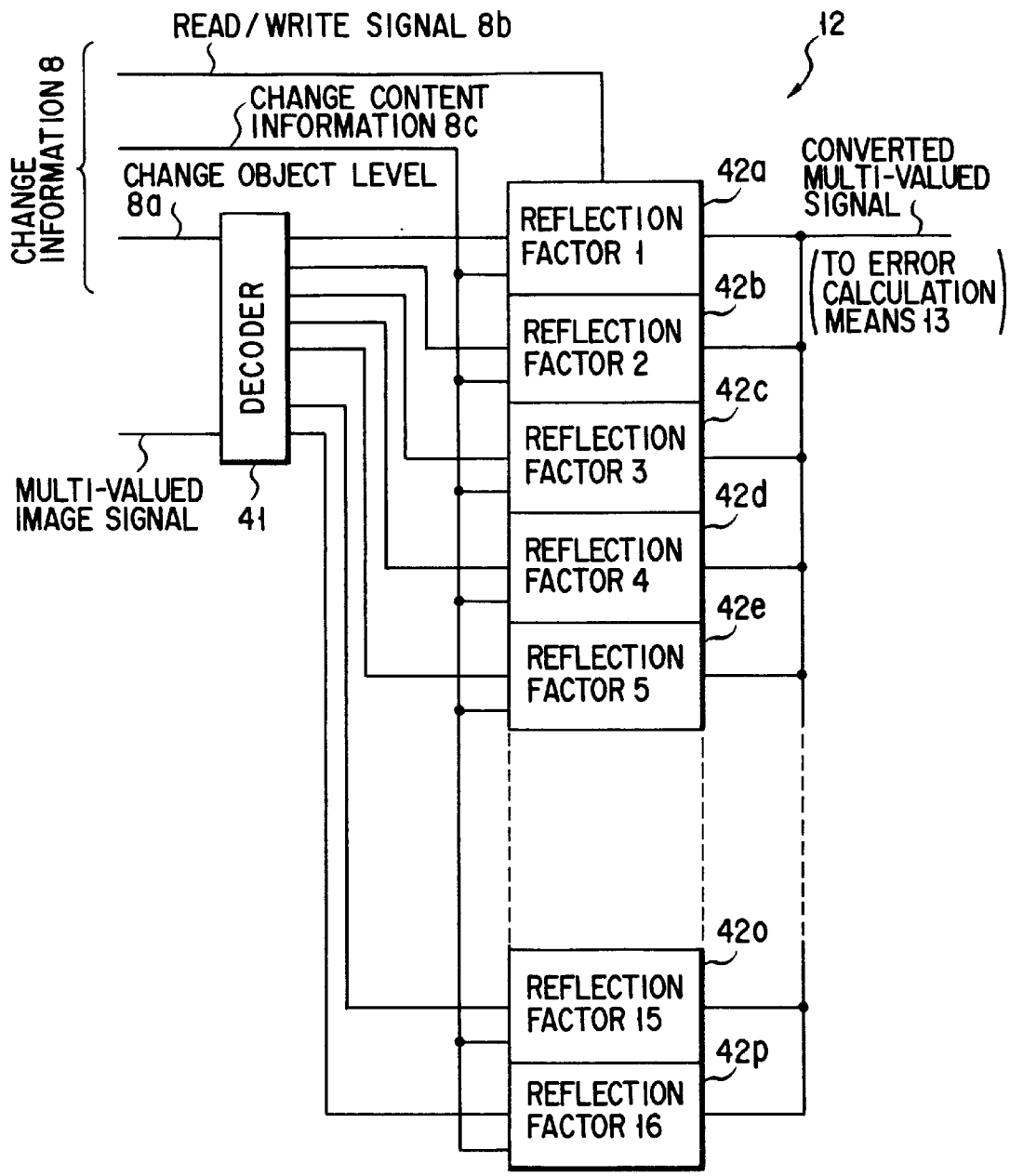
F I G. 9

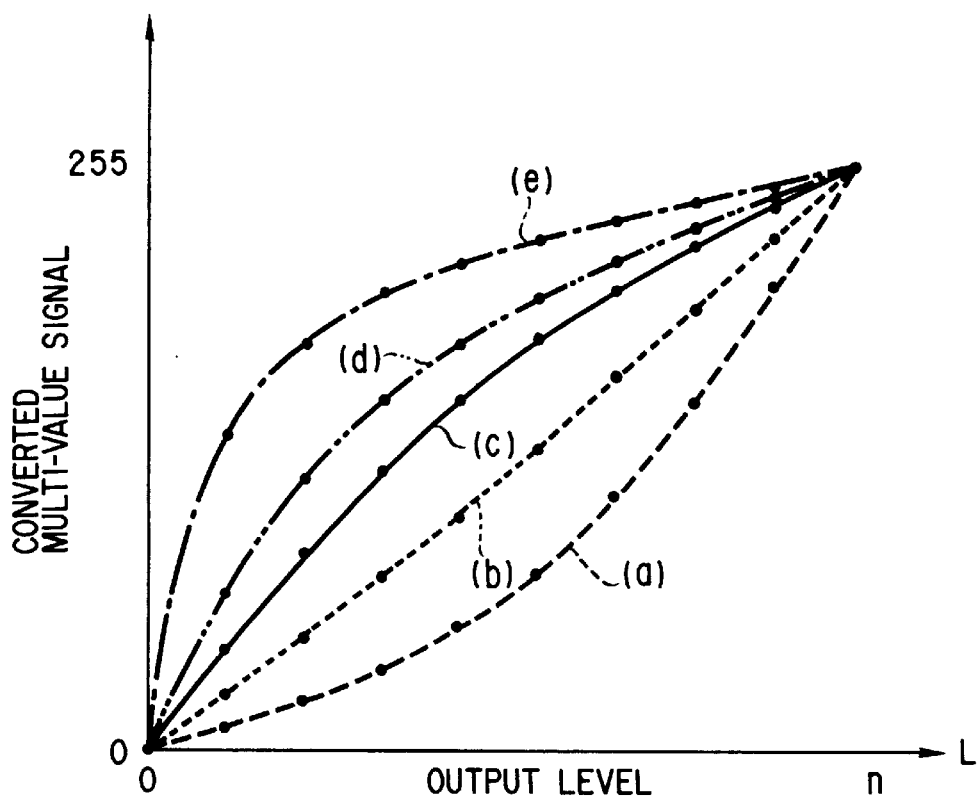
F I G. 23
F I G. 24

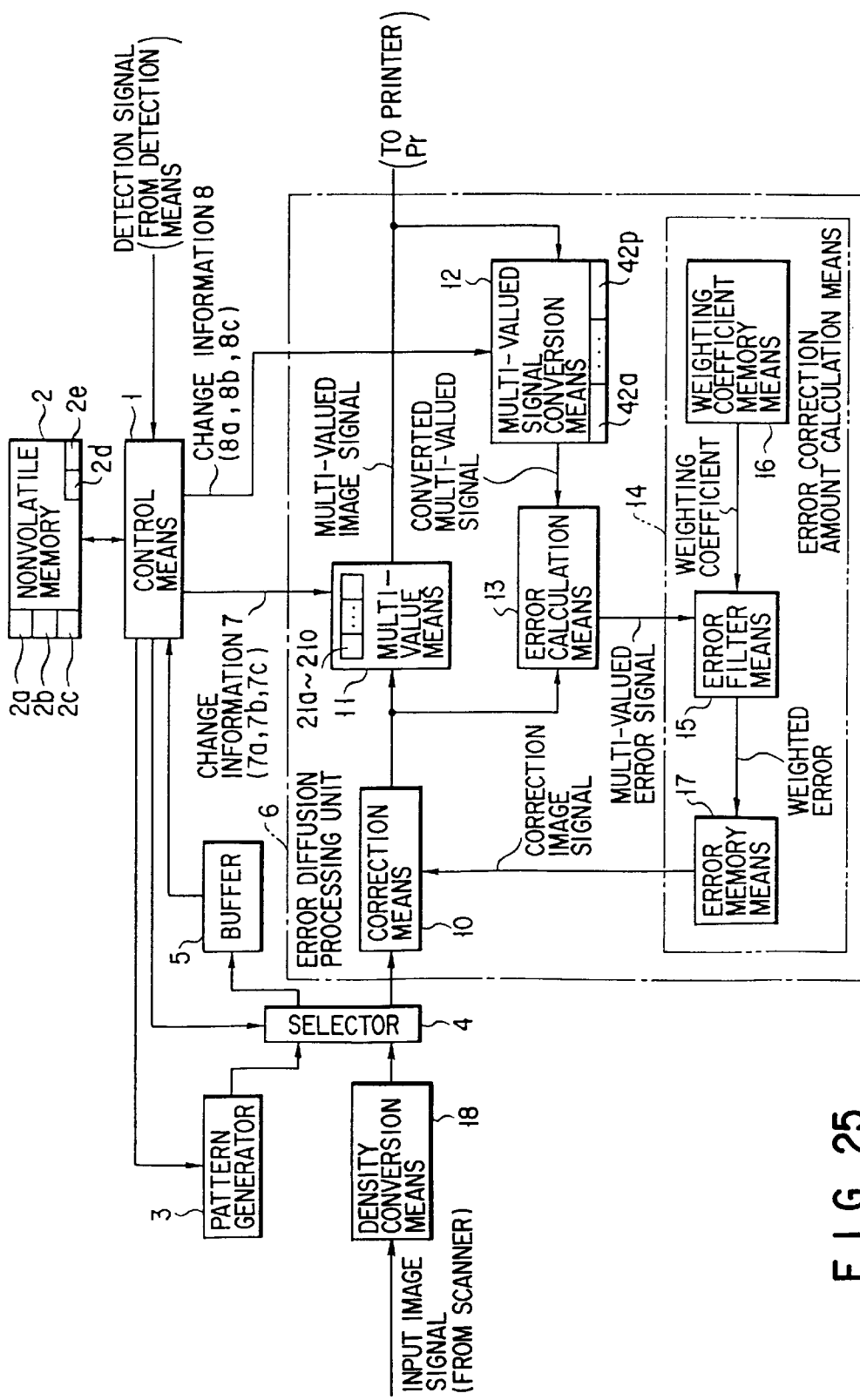
F I G. 25

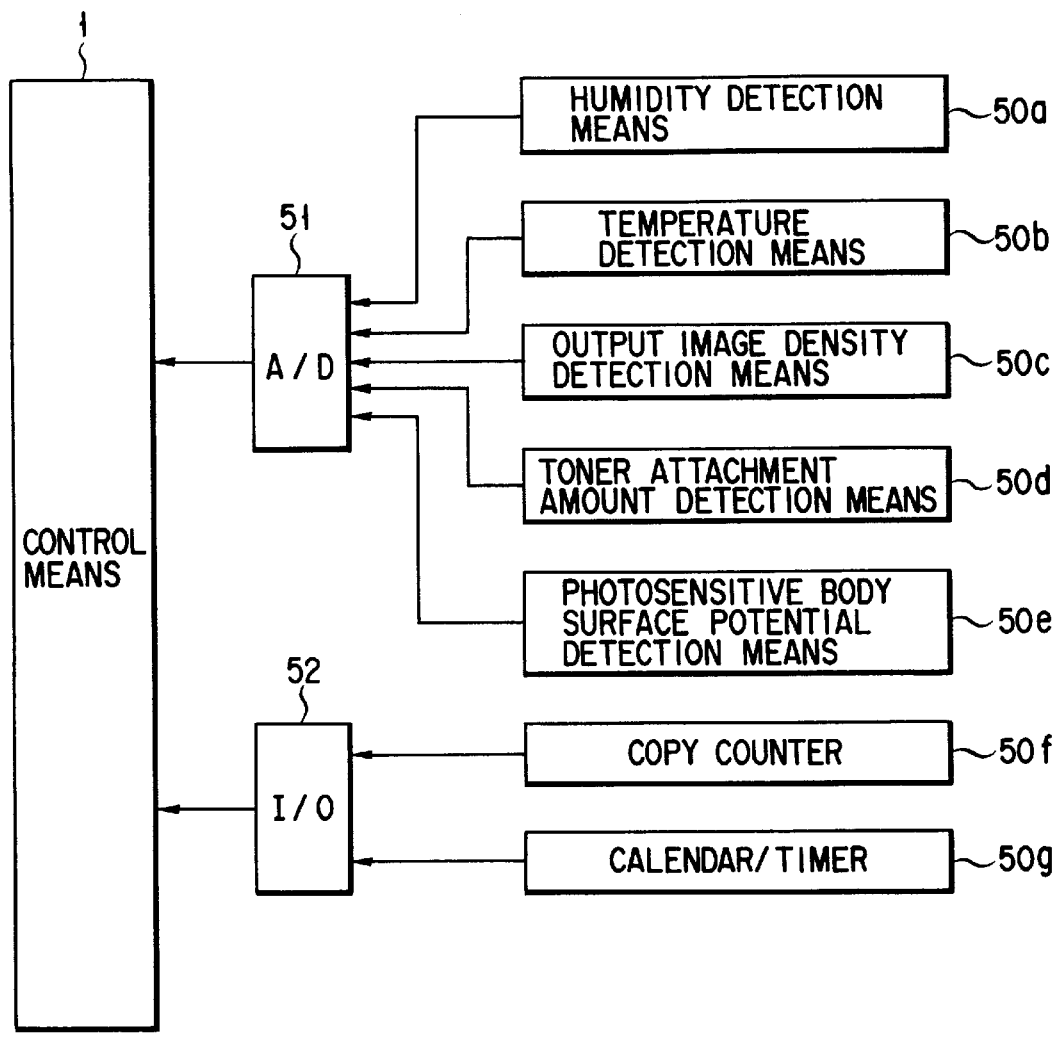
F I G. 27

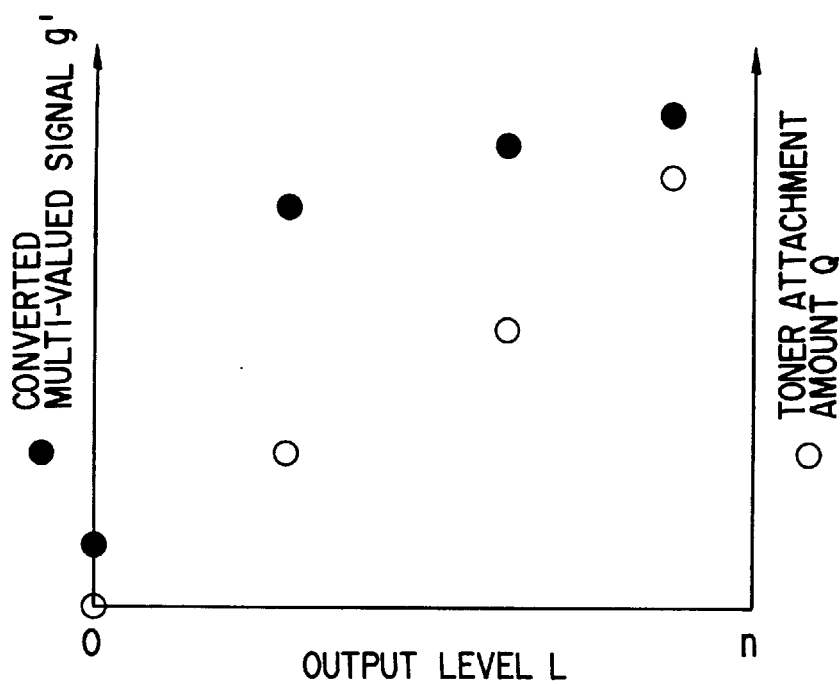
F I G. 29
F I G. 30

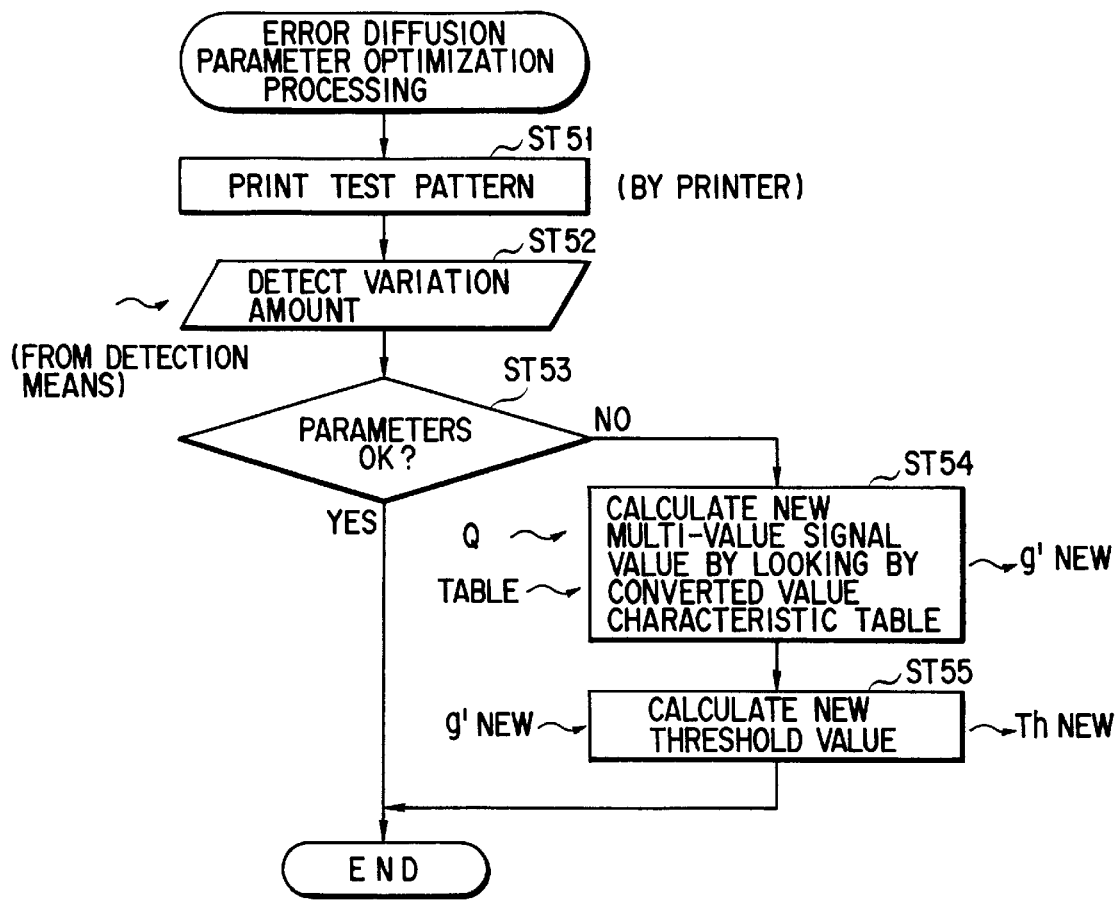
F I G. 31

IMAGE PROCESSING APPARATUS

BACKGROUND OF THE INVENTION

1. Field of the Invention

The present invention relates to an image processing apparatus, which performs multi-level conversion processing of a document image including a photograph image using an error diffusion method to satisfy faithful gradation reproducibility, and maintains good image quality by minimizing a variation in gradation characteristics under the influence of a change in environment, aging, and the like.

2. Description of the Related Art

In association with an image forming apparatus for printing, copying, or displaying a document original including a photograph image or image data obtained via document creation processing and image edit processing using a computer, an error diffusion method has been proposed as a binary conversion method which can satisfy gradation characteristics of both a photograph image area and a character/line image area, and can provide higher resolution characteristics of the character/line image area than those of an ordered dither method. The error diffusion method is disclosed in R. W. Floyd L. Steinberg: Pro: SID Vol. 17(2), pp 75–77, 1976. In the error diffusion method, a level obtained by multiplying multi level (binarized) errors of already multi level (binarized) pixels around a pixel of interest with a weighting coefficient is added to the pixel of interest, the sum is multi-level (binary) converted by a fixed threshold level, and a multi level (binarized) error generated at that time is distributed to the surrounding pixels. More specifically, in this method, although an output level corresponding to each pixel unit is predetermined multi-level data (binary data), the sum total of errors associated with a local area of an output image corresponding to that of an original image (multi-level image data) having continuous gradation is eliminated or minimized, thus compensating for gradation characteristics. For this reason, input gradation information can be expressed by the number of output levels smaller than that of the gradation levels of input pixel signals.

In such an error diffusion processing means, a multi level signal means a predetermined number of levels such as the number of write levels of an image forming system. In contrast to this, an input signal has a physically different dimension from that of a multi level signal to be output since it is a signal read by, e.g., a scanner or an image created using a computer, and means reflection factor or density information. For this reason, in error calculations, a contradiction upon calculations, i.e., addition/subtractions between different dimensions, occurs.

When the gradation characteristics of an image output from an image forming apparatus for forming an image based on a multi level signal as a result of error diffusion processing vary due to a change in environment, aging, or the like, a gamma correction means or color correction means, a multi level signal conversion means, or the like is externally arranged at the upstream or downstream side of an error diffusion processing unit, so as to calculate correction characteristics in correspondence with a detection result of a variation in gradation characteristics, and to modify, e.g., table contents. However, even in an input/output relationship free from the above-mentioned contradiction upon calculations between different dimensions when no variation in gradation characteristics occurs, if the gradation characteristics of an output image vary, and the gamma table is corrected, the relationship between the corrected input pixel signal and the multi level undesirably changes, thus deteriorating accuracy of error calculations.

Furthermore, in error diffusion processing for performing multi-level conversion using a fixed threshold level, a macroscopic change in gradation characteristics can be eliminated upon practical variations in gradation characteristics and the number of gradation levels corresponding to levels of multi level signals, but deterioration of image quality such as a decrease in resolution, conspicuousness of a texture, and the like cannot be suppressed.

SUMMARY OF THE INVENTION

It is an object of the present invention to provide an image processing apparatus which can automatically and accurately compensate for and minimize variations in gradation characteristics and resolution within a short period of time, can eliminate or omit maintenance processing, and can reduce total running cost, even when practical gradation expression by an image forming system has one or both of area gradation characteristics and density gradation characteristics, even when the gradation characteristics of the image forming system vary due to a change in environment, aging, or the like, and even when the number of practical gradation levels per pixel decreases due to the variation.

To achieve the above object, the present invention provides an image processing apparatus comprising:

scanner means for optically reading an image so as to provide a pixel signal, the pixel signal representing a level of reflectance of light read by the scanner means;

first conversion means for converting the pixel signal provided from the scanner means into a multi level signal;

means for forming an image on an image carrier on the basis of the multi level signal converted by the first conversion means;

means for detecting an image density of the image formed on the image carrier by the forming means;

second conversion means for converting the converted multi level signal to a reflectance signal representing the level of reflectance of light corresponding to a level of the converted multi level signal;

means for changing the reflectance signal converted by the second conversion means based on the image density detected by the detecting means to stabilize image density changes of the image formed on the image carrier;

means for calculating an error between the level of the signal changed by the changing means and the level of the pixel signal provided by the scanner means; and means for correcting the pixel signal provided from the scanner means on the basis of the error calculated by the calculating means.

The present invention also provides an image processing apparatus comprising:

means for reading an image so as to provide a pixel signal corresponding to the image;

first conversion means for converting the pixel signal provided by the reading means into a first signal representing a density level of the pixel signal;

second conversion means for converting the first signal converted by the first conversion means into a multi level signal;

means for forming an image on an image carrier on the basis of the multi level signal converted by the second conversion means;

means for detecting an image density of the image formed on the image carrier by the image forming means;

third conversion means for converting the converted multi level signal into a second signal representing a density level corresponding to a level of the converted multi level signal;

means for changing, the second signal converted by the third conversion means based on the image density detected by the detecting means to output a third signal so as to stabilize image density changes of the image formed on the image carrier;

means for calculating an error between the level of the third signal changing by the change means and a level of the first signal provide by the output means; and means for correcting the pixel signal provided from the output means on the basis of the error calculated by the calculating means.

The present invention further provides an image processing apparatus comprising:

scanner means for optically reading an image so as to provide a pixel signal, the pixel signal representing a level of reflectance of light read by the scanner means;

first conversion means for converting the pixel, signal provided from the scanner means into a multi level signal using a predetermined threshold level;

means for forming an image on an image carrier on the basis of the multi level signal converted by the first conversion means;

means for detecting an image density of the image formed on the image carrier by the forming means;

second conversion means for converting the converted multi level signal to a reflectance signal representing the level of reflectance of light corresponding to a level of the converted multi level signal;

means for changing the reflectance signal converted by the second conversion means based on the image density detected by the detecting means and the threshold level used in the first conversion means to stabilize image density changes of the image formed on the image carrier;

means for calculating an error between the level of the signal changed by the changing means and the level of the pixel signal provided by the scanner means; and means for correcting the pixel signal provided from the scanner means on the basis of the error calculated by the calculating means.

The present invention further provides an image processing apparatus comprising:

means for reading an image so as to provide a pixel signal corresponding to the image;

first conversion means for converting the pixel signal provided by the reading means into a first signal representing a density level of the pixel signal;

second conversion means for converting the first signal converted by the first conversion means into a multi level signal using a predetermined threshold level;

means for forming an image on an image carrier on the basis of the multi level signal converted by the second conversion means;

means for detecting an image density of the image formed on the image carrier by the image forming means;

third conversion means for converting the converted multi level signal into a second signal representing a density level corresponding to a level of the converted multi level signal;

means for changing, the second signal converted by the third conversion means based on the image density detected by the detecting means to output a third signal and the threshold level used in the second conversion means so as to stabilize image density changes of the image formed on the image carrier;

means for calculating an error between the level of the third signal changing by the change means and a level of the first signal provide by the output means; and means for correcting the pixel signal provided from the output means on the basis of the error calculated by the calculating means.

The present invention further provides an image processing apparatus comprising:

means for supplying a pixel signal, the pixel signal representing a level of reflectance of light constituted by a predetermined number of input levels;

first conversion means for converting the pixel signal provided from the scanner means into a multi level signal constituted by a predetermined number of output levels equal to the predetermined number of input levels;

means for forming an image on an image carrier on the basis of the multi level signal converted by the first conversion means;

means for detecting an image density of the image formed on the image carrier by the forming means;

second conversion means for converting the converted multi level signal to a reflectance signal representing the level of reflectance of light corresponding to a level of the converted multi level signal;

means for changing the reflectance signal converted by the second conversion means based on the image density detected by the detecting means to stabilize image density changes of the image formed on the image carrier;

means for calculating an error between the level of the signal changed by the changing means and the level of the pixel signal provided by the supplying means; and means for correcting the pixel signal provided from the supplying means on the basis of the error calculated by the calculating means.

The present invention further provides an image processing apparatus comprising:

means for supplying a pixel signal;

means for converting the supplied pixel signal into a multi level signal;

means for forming an image on an image carrier on the basis of the multi level signal converted the converting means;

means for detecting an image density of the image formed on the image carrier by the forming means;

means for changing the multi level signal converted the converting means in accordance with the image density detected by the detecting means so as to stabilize the image density changes of the image formed on the image carrier;

means for calculated an error between the level of the multi level signal supplied from the supplying means; and means for correcting the pixel signal supplied from the supplying means on the basis of the error calculated by the calculating means.

The present invention further provides an image processing apparatus comprising:

means for supplying a pixel signal;

means for converting the supplied pixel signal into a multi level signal;

means for forming an image on an image carrier on the basis of the multi level signal converted the converting means;

means for detecting an image forming condition to cause image density changes of the image formed on the image carrier;

means for changing the multi level signal converted the converting means in accordance with the image forming condition detected by the detecting means so as to stabilize the image density changes of the image formed on the image carrier;

means for calculating an error between the level of the multi level signal changed by the changing means and the level of the pixel signal supplied from the supplying means; and means for correcting the pixel signal supplied from the supplying means on the basis of the error calculated by the calculating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a diagram showing the arrangement of a comparator;

FIG. 7 is a diagram showing the arrangement of the comparator;

FIG. 9 is a block diagram showing the arrangement of a multi level signal conversion means;

FIG. 17 is a flow chart for explaining processing upon power ON;

FIG. 23 is a graph showing examples of converted multi level signal levels corresponding to output levels;

FIG. 24 is a table showing the contents of a multi level signal conversion table for storing correction amounts for the converted multi level signal levels corresponding to output levels;

FIG. 25 is a block diagram showing the arrangement of the overall image processing apparatus according to another embodiment of the present invention;

FIG. 27 is a block diagram showing examples of various detection means;

FIG. 29 is a graph showing examples of converted multi level signal levels and toner attachment amounts corresponding to output levels;

FIG. 30 is a table showing the contents of a multi level signal conversion table storing converted multi level signal levels and toner attachment amounts corresponding to output levels; and FIG. 31 is a flow chart for explaining error diffusion parameter optimization processing.

DETAILED DESCRIPTION OF THE PREFERRED EMBODIMENTS

The first embodiment of the present invention will be described hereinafter with reference to the accompanying drawings.

Figure 1:
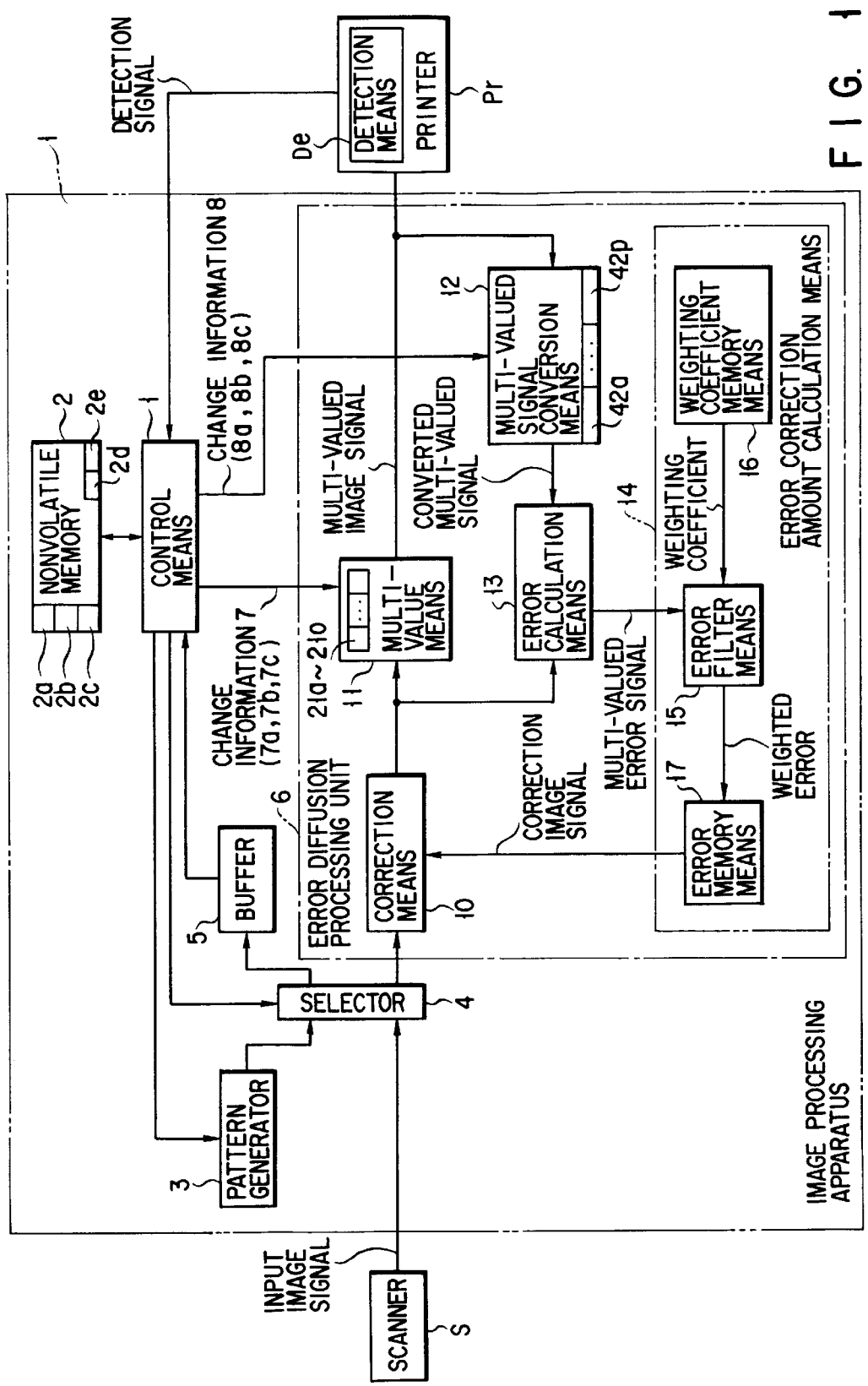
FIG. 1 is a block diagram showing the arrangement of the overall image processing apparatus according to an embodiment of the present invention.

The first embodiment relates to an image forming system which comprises, as shown in FIG. 1, an input apparatus, e.g., a CCD scanner S for A/D-converting an analog signal which linearly changes with respect to a change in reflection factor in units of pixels in accordance with the read resolution of an original image, and outputting image data as a reflection factor signal which is normalized in correspondence with pixels, an image processing apparatus I for outputting an output image signal (output pixel signal; multi level image signal) as multi level data which is subjected to image processing such as error diffusion on the basis of an input image signal (input pixel signal) as image data from the CCD scanner S, and an output apparatus Pr having a predetermined number of levels such as an electrophotography printer, a sublimation type thermal transfer printer, a dot printer, or the like, for expressing gradation by area modulation for changing the print area per pixel on the basis of the multi level image signal from the image processing apparatus I.

The image processing apparatus I corrects an input pixel signal of a pixel of interest by an error diffusion method using, e.g., 8-bit digital data per pixel as an input image signal (input pixel signal; reflection factor signal) input from the CCD scanner S.

More specifically, as shown in FIG. 1, the image processing apparatus I comprises a control means 1, a nonvolatile memory 2, a pattern generator 3, a selector 4, a buffer 5, and an error diffusion processing unit 6.

The control means 1 controls the entire apparatus, and executes initial adjustment processing, and optimization processing of threshold levels and reflection factor levels as error diffusion parameters, as will be described later. The control means 1 is connected to an operation panel (not shown) used for instructing various kinds of operations. The control means 1 receives a detection signal from a detection means De for detecting the toner attachment amount of an area gradation type electrophotography printer Pr as the output apparatus.

The nonvolatile memory 2 comprises a test pattern data memory 2a for storing reflection factor data of two or three test patterns, an initial level memory 2b for storing initial levels to be stored in threshold level registers 21a, . . . in a multi-level means 11 (to be described later) and initial levels of reflection factors corresponding to levels to be stored in reflection factor memories 42a, . . . in a multi level signal conversion means 12, a multi level signal conversion table (see FIG. 24) 2c for storing correction amounts (Δg') for multi level signal levels corresponding to output levels (multi level image signals), a current level memory 2d for storing the latest threshold levels set in the threshold level registers 21a, . . . in the multi-level means 11, and latest reflection factors (converted multi level signal levels) corresponding to levels set in the reflection factor memories 42a in the multi level signal conversion means 12, and a memory 2e for storing a control normalized level used for discriminating whether or not a change amount falls within an allowable range.

The pattern generator 3 generates a test pattern in accordance with an instruction from the control means 1.

The selector 4 outputs the test pattern from the pattern generator 3 to the error diffusion processing unit 6 when the test pattern is to be printed on a paper sheet or is formed on a photosensitive body. In a normal print mode, the selector 4 outputs image data from the scanner S to the error diffusion processing unit 6. In an adjustment mode, the selector 4 outputs density data from the scanner S to the buffer 5.

The buffer 5 temporarily stores density data from the selector 4, and outputs the stored data to the control means 1.

As shown in FIG. 1, the error diffusion processing unit 6 comprises a correction means 10, the multi-level means (first conversion means) 11, the multi level signal conversion means (second conversion means) 12, an error calculation means (first calculation means) 13, and an error correction amount calculation means (second calculation means) 14.

The correction means 10 corrects input image data of a pixel of interest as reflection factor data consisting of a plurality of bits from the selector 4 by adding it to a correction amount signal from an error memory 17. The corrected image signal is output to the multi-level means 11 and the error calculation means 13. The correction means 10 comprises, e.g., an adder.

The multi-level means 11 compares the corrected image signal of the pixel of interest with a threshold level for multi-level conversion, and outputs a multi level image signal as multi level data corresponding to the number of output steps (the number of levels; 4) of the printer Pr as the output apparatus. The multi-level means 11 performs multi-level conversion with reference to a threshold level for multi-level conversion set by the control means 1. The multi level image signal from the multi-level means 11 is output to the printer Pr, and is also output to the multi level signal conversion means 12.

The multi level signal conversion means 12 converts the multi level image signal from the multi-level means 11 into a converted multi level signal as a reflection factor signal having the same dimension as that of input image data, and outputs the converted multi level signal to the error calculation means 13.

The error calculation means 13 calculates a multi level error signal of the pixel of interest on the basis of the corrected image signal from the correction means 10 and the multi level signal from the multi-level signal conversion means 12, and the calculated multi level error signal is output to the error correction amount calculation means 14.

The error correction amount calculation means 14 calculates a correction amount signal on the basis of the multi level error signal of the pixel of interest from the error calculation means 13, and pre-stored multi level errors of pixels around the pixel of interest, and outputs the calculated correction amount signal to the correction means 10.

Figure 2:
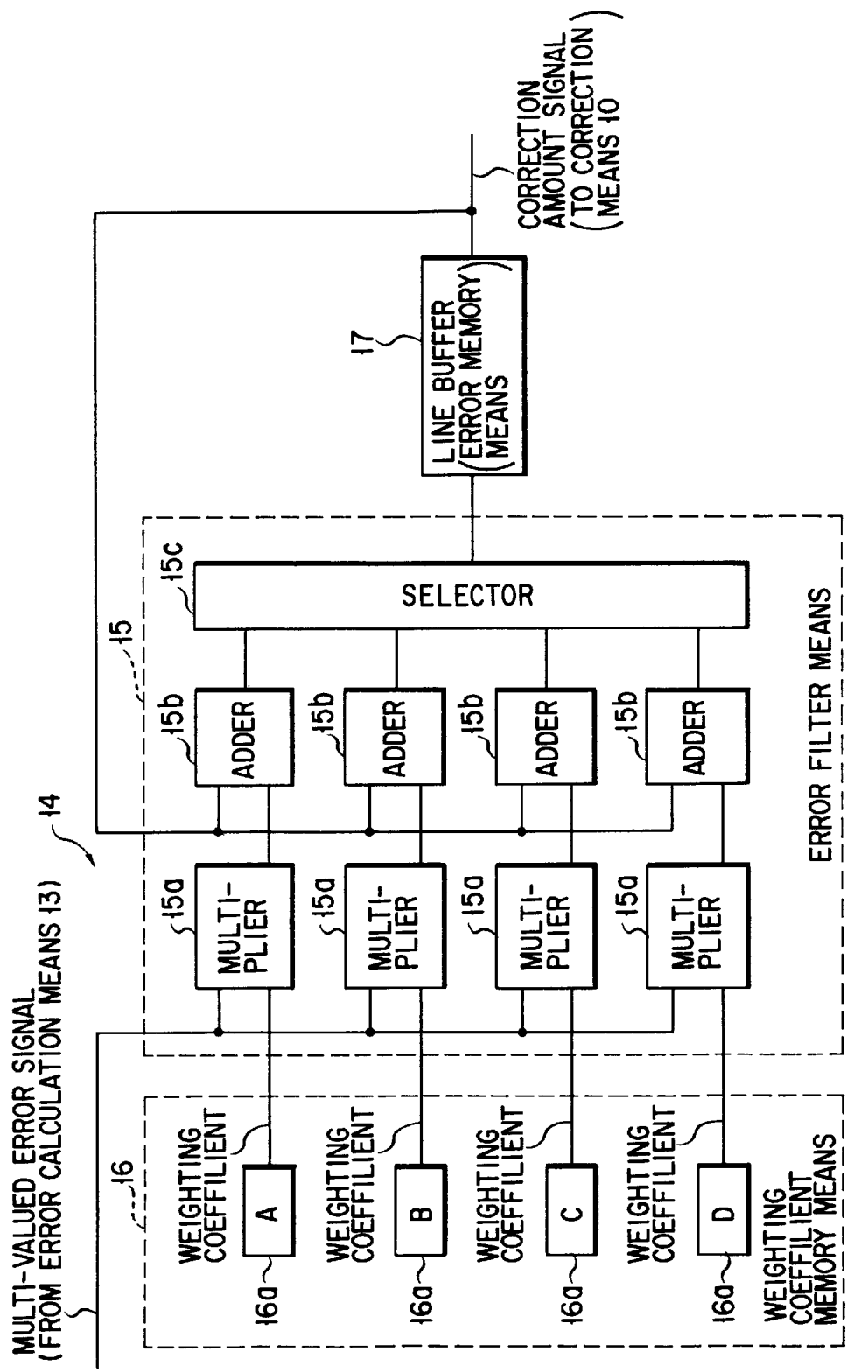
FIG. 2 is a block diagram showing the arrangement of a weighting coefficient memory means, an error filter means, and an error memory means.

As shown in FIGS. 1 and 2, the error correction amount calculation means 14 comprises an error filter means 15, a weighting coefficient memory means 16, and an error memory means 17.

Figure 3:
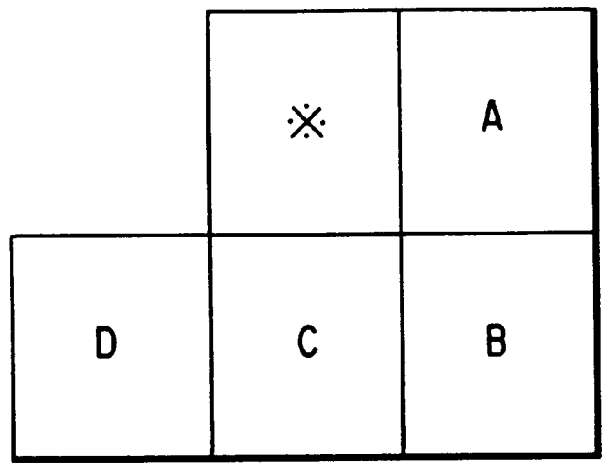
FIG. 3 is a view for explaining the storage contents of the weighting coefficient memory means.

The weighting coefficient memory means 16 stores weighting coefficients for four surrounding pixels around the pixel of interest (as shown in FIG. 3, four surrounding pixels include a pixel on the same line as a pixel * of interest, and pixels on the immediately preceding line), and for example, stores weighting coefficients A, B, C, and D (A=7/16, B=1/16, C=5/16, and D=3/16) in four registers 16a, . . .

The error filter means 15 calculates weighted errors of the surrounding four pixels around the pixel of interest by multiplying the multi level error signal from the error calculation means 13 with the weighting coefficients A, B, C, and D of the weighting coefficient memory means 16. The calculated weighted errors are output to the error memory means 17. For example, the error filter means 15 comprises four multipliers 15a, . . . , four adders 15b, and a selector 15c.

Figure 4:
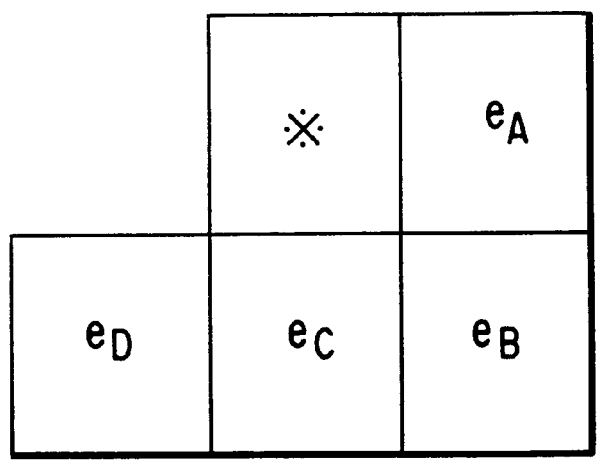
FIG. 4 is a view for explaining the storage contents of the error memory means.

The error memory means 17 calculates a correction amount signal for the pixel of interest by adding and storing the weighted errors for four pixels calculated by the error filter means 15 to areas $e_A$, $e_B$, $e_C$, and $e_D$ with respect to the pixel * of interest, as shown in FIG. 4, and outputs the calculated correction amount signal to the correction means 10. The error memory means 17 comprises, e.g., a line buffer.

Figure 5:
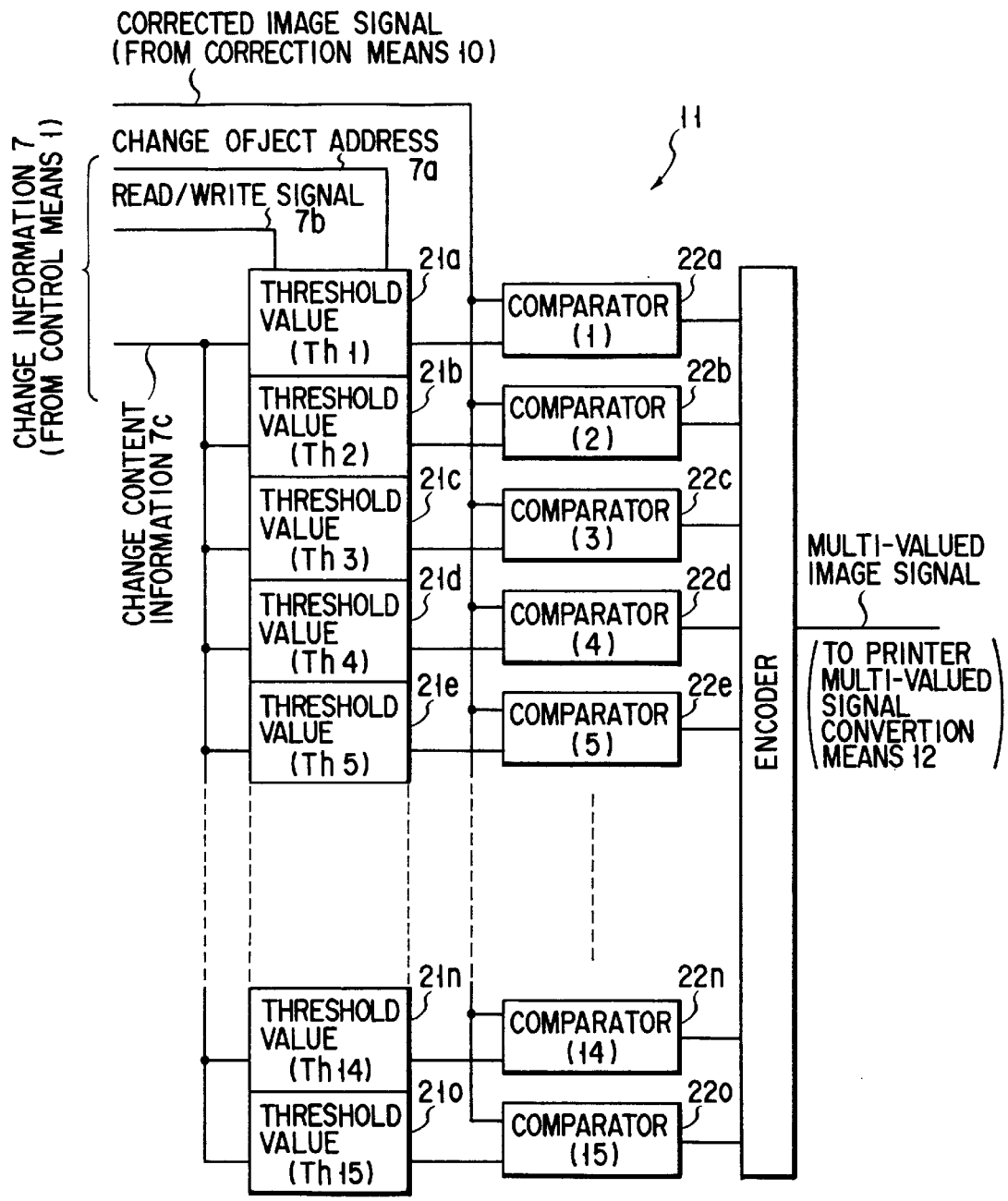
FIG. 5 is a block diagram showing the arrangement of a multi-level means.

The multi-level means 11 comprises 15 threshold level registers 21a, . . . , 21o, 15 comparators 22a, . . . , 22o, and an encoder 23, as shown in FIG. 5. In the threshold level registers 21a, . . . , 21o, threshold levels Th1 to Th15 are set in correspondence with a change object address, a read/write signal, and change content information as change information from the control means 1. The threshold levels Th1 to Th15 in the threshold level registers 21a, . . . , 21o are respectively supplied to the comparators 22a, . . . , 22o, which receive the corrected image signal from the correction means 10. The comparison results from the comparators 22a, ..., 22o are encoded by the encoder 23 to be converted into a multi level image signal, and the multi level image signal is output.

For example, when the number of gradation levels is 2, only the threshold level Th1 of the threshold level register 21a is set, and only the comparator 22a is enabled. Thus, when the corrected image signal is larger than the threshold level Th1, "1" is output from the comparator 22a and the encoder 23; when the corrected image signal is smaller than the threshold level Th1, "0" is output from the comparator 22a and the encoder 23.

When the number of gradation levels is 4, the threshold levels Th1, Th2, and Th3 of the threshold level registers 21a to 21c are set, and the comparators 22a to 22c are enabled. Thus, when the corrected image signal is smaller than the threshold level Th1, "0" is output from each of the comparators 22a to 22c, and "00" is output from the encoder 23. When the corrected image signal is between the threshold levels Th1 and Th2, "1" is output from the comparator 22a, "0" is output from each of the comparators 22b and 22c, and "01" is output from the encoder 23. When the corrected image signal is between the threshold levels Th2 and Th3, "1" is output from each of the comparators 22a and 22b, "0" is output from the comparator 22c, and "10" is output from the encoder 23. When the corrected image signal is larger than the threshold level Th3, "1" is output from each of the comparators 22a to 22c, and "11" is output from the encoder 23. When the number of gradation levels is "8" or "16", a multi level image signal is similarly output.

Figure 8:
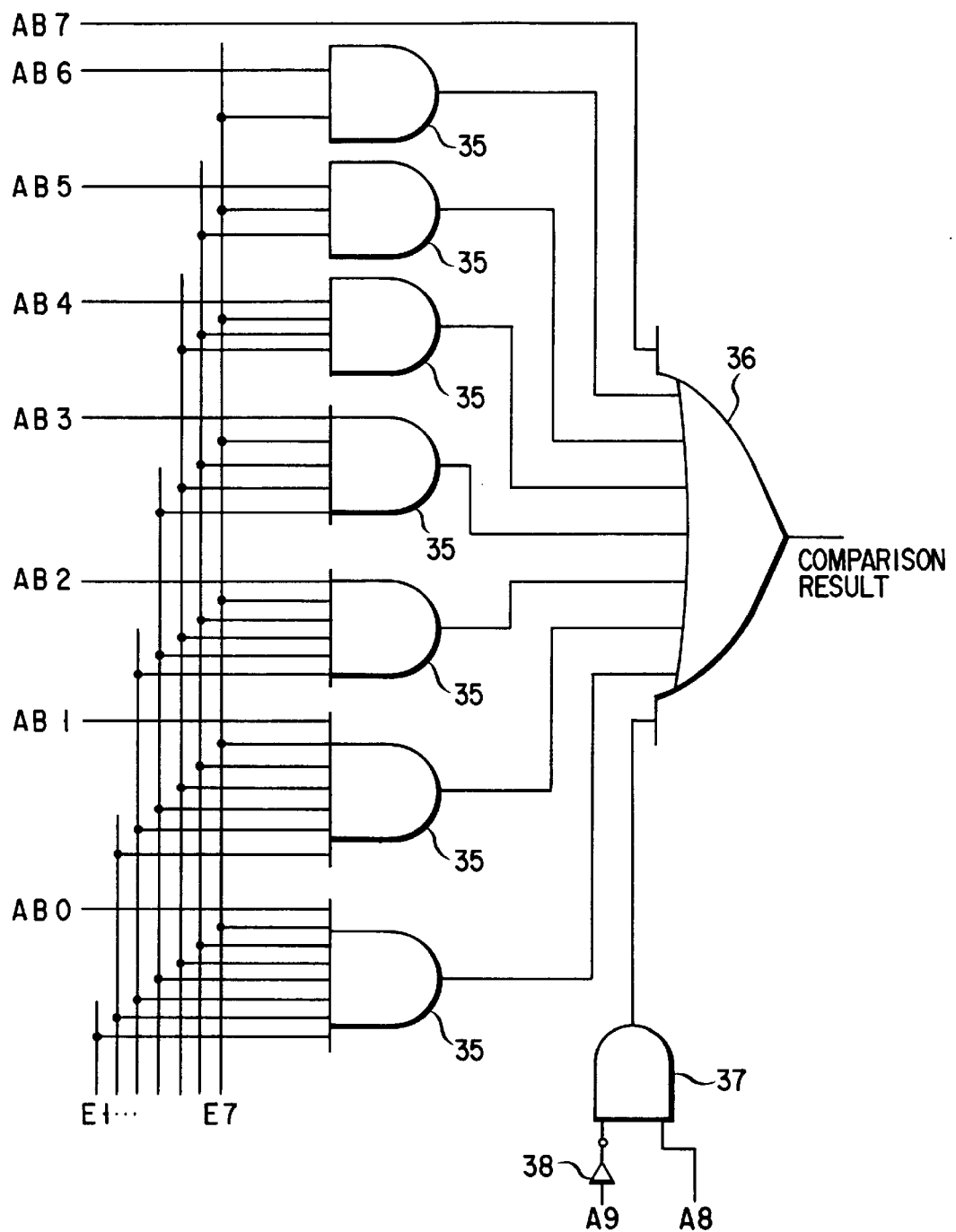
FIG. 8 is a diagram showing the arrangement of the comparator.

FIGS. 6 to 8 show an example of the arrangement of the comparator 22a (22b, ... ). Referring to FIGS. 6 to 8, reference symbols A0 to A9 denote bits of the corrected image signals; and B0 to B9, bits of threshold levels Th1 to Th15. A 10-bit corrected image signal is compared with an 8-bit threshold level of each of the comparators 22a, ..., as shown in FIG. 6, and each of the comparators 22a, ... outputs a 1-bit comparison result. As shown in FIG. 7, the bits at the input side of the comparator 22a are processed by an AND gate 31, inverters 32 and 33, and an EX-OR gate 34. As shown in FIG. 8, the bits at the output side of the comparator 22a are processed by AND gates 35, ..., an OR gate 36, and an inverter 37.

As shown in FIG. 9, the multi level signal conversion means 12 comprises a decoder 41, and 16 reflection factor memories 42a, ..., 42p. In each of the reflection factor memories 42a, ..., 42p, a reflection factor signal corresponding to each level of the multi level image signal is set. More specifically, in the reflection factor memories 42a, ..., 42p, reflection factors 1 to 15 are set on the basis of a change object level (supplied via the decoder 41), a read/write signal, and change content information as change information from the control means 1.

If the absolute reflection factor for an original is represented by Rabs (a real number from 0 to 1); the absolute reflection factor of a white reference plate of the scanner S, RabsW (e.g., 0.91); the absolute reflection factor of a black reference plate of the scanner S, RabsB (e.g., 0.002); A/D-converted reflection factor data, Rad (an integer from 0 to 255); the A/D-converted level for the white reference plate, RadW (e.g., 240); the A/D-converted level for the black reference plate, RadB (e.g., 10); the reflection factor data after shading correction, R (a real number from 0 to 255); the reflection factor data after shading correction for the white reference plate, RW (0); the reflection factor data after shading correction for the black reference plate, RB (255); the converted absolute reflection factor, R' (a real number from 0 to 1); the converted absolute reflection factor for the white reference plate, RW' (e.g., 0.91); the converted absolute reflection factor for the black reference plate, RB' (e.g., 0.002); the converted density, D' (e.g., a real number form 0.04 to 2.7); the converted density for the white reference plate, DW' (e.g., 0.04); and the converted density for the black reference plate, DB' (e.g., 2.7), Rabs is A/D-converted as follows within a period [RabsB, RabsW]:

$$Rad = Aad * Rabs + Bad \tag{1}$$

for $$Aad = (RadW - RadB)/(RabsW - RabsB) \tag{2}$$

$$Bad = RadW - Aad * RabsW \tag{3}$$

In shading correction, if correction is performed in the following procedures:

$$X1 = Rad - RadB \tag{4}$$

$$X2 = RadW - RadB \tag{5}$$

$$X3 = X1/X2 \tag{6}$$

$$R = 255 * (1 - X3) \tag{7}$$

then, from equations (4) to (7), a reflection factor signal R output from the scanner S is given by:

$$R = 255 * \{1 - (Rad - RadB)/(RadW - RadB)\} \tag{8}$$

From equation (8), data after shading correction for the white and black reference plates are respectively given by:

$$Rad = RadW \rightarrow RW = 0 \tag{9}$$

$$Rad = RadB \rightarrow RB = 255 \tag{10}$$

This embodiment exemplifies a system which receives a linearly normalized reflection factor signal R with respect to the reflection factor of an original as an input pixel signal f (to be described later), and the same dimension as that of the reflection factor signal R given by equation (8) will be simply referred to as a reflection factor hereinafter.

More specifically, a multi level image signal from the multi-level means 11 is assumed to be a signal which represents an output level L for expressing the ordinal number of the number of gradation levels of the output apparatus, and the output apparatus expresses area gradation by changing the print area per pixel on the basis of this output level.

When the print area per pixel corresponding to each output level varies due to a change in environment (temperature, humidity, atmospheric pressure, and the like) and aging (deterioration of an image forming medium, a write system, and the like), a deviation is generated between the reflection factor corresponding to each output level in the multi level signal conversion means 12, and the reflection factor corresponding to a pixel to be actually printed, and a multi level error signal calculated by comparing the converted multi-level signal and the correction pixel signal becomes different from an actual one. As a result, desired gradation characteristics of an output image cannot be reproduced in correspondence with an input original image or image signal.

In this embodiment, the detection means De for detecting the toner attachment amount of the printer Pr detects a change in image forming condition or a change in density (reflection factor) of a formed image, and a new reflection factor close to a reflection factor per pixel corresponding to each varied output level is set in the multi level signal conversion means in correspondence with the detected change, so as to eliminate the variation in gradation characteristics, thus allowing error calculations as accurate as possible.

Referring to FIG. 1, the control means 1 calculates converted multi level signal contents to be changed in the multi level signal conversion means 12, and threshold levels to be changed in the multi-level means 11 on the basis of the detection signal from the detection means De, and changes the contents of the multi-level signal conversion means 12 and the multi-level means 11 in correspondence with the corresponding change information.

The decoder 41 shown in FIG. 9 receives a multi-level image signal from the multi-level means 11 in the above-mentioned normal processing, and receives a change object level 8a as one element of change information 8 from the control means 1 in a content change mode. In the normal processing, a reflection factor corresponding to each level is read out from the reflection factor memories 42a, . . . which store reflection factors corresponding to the levels of the multi level image signal, and the readout reflection factor is output as a converted multi level signal. At this time, as a read/write signal 8b, only a read signal is input. On the other hand, in the content change mode, the memory address of the reflection memories 42a, . . . is designated by the change object level 8a, and the contents of the designated memory are rewritten with the contents of change content information 8c by setting the read/write signal 8b to be a write signal.

In the multi-level means 11 shown in FIG. 5, in the above-mentioned normal processing, the contents of the threshold level registers 21a, . . . which store threshold levels to be compared with the correction pixel signal from the correction means 10, are read out and output as reflection factor threshold levels. At this time, only a read signal is input as a read/write signal 7b. On the other hand, in the content change mode, a threshold level stored in the register designated by a change object address 7a is rewritten with the contents of corresponding change content information 7c by setting the read/write signal 7b to be a write signal.

Figure 10:
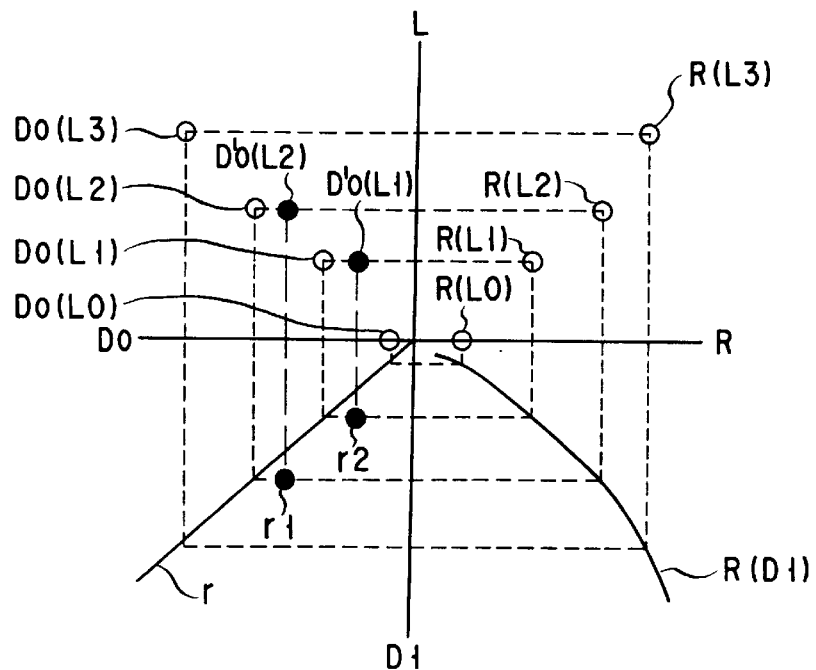
FIGS. 10 and 11 are graph showing the relationship among an original density Di, a reflection factor R, an output level L, and an output density Do so as to explain a variation state.

FIG. 10 shows the relationship among an original density Di, reflection factor R, output level L, and output density Do so as to explain a variation state. Assume that the number of output levels of the output apparatus is 4 (four-level data; L0, L1, L2, and L3), and a density corresponding to each level of the output apparatus is represented by Do(L). Also, assume that the converted multi level signals corresponding to each level in the multi level signal conversion means 12 is set to be R(L) for the purpose of reproducing the gradation characteristics (so-called gamma characteristics) of the original density and the output image density. At this time, Do(L), Di(L), and R(L) corresponding to each level L are plotted along a line representing gamma (γ) characteristics, and are preserved (short dashed lines).

Assume that the density per pixel varies due to a change in environment, aging, or the like. In the example shown in FIG. 10, assume that the image densities Do(L1) and Do(L2) change to Do'(L1) and Do'(L2). Since the densities corresponding to the levels L1 and L2 vary, the gamma characteristics change to nonlinear characteristics passing points γ1 and γ1.

Figure 11:
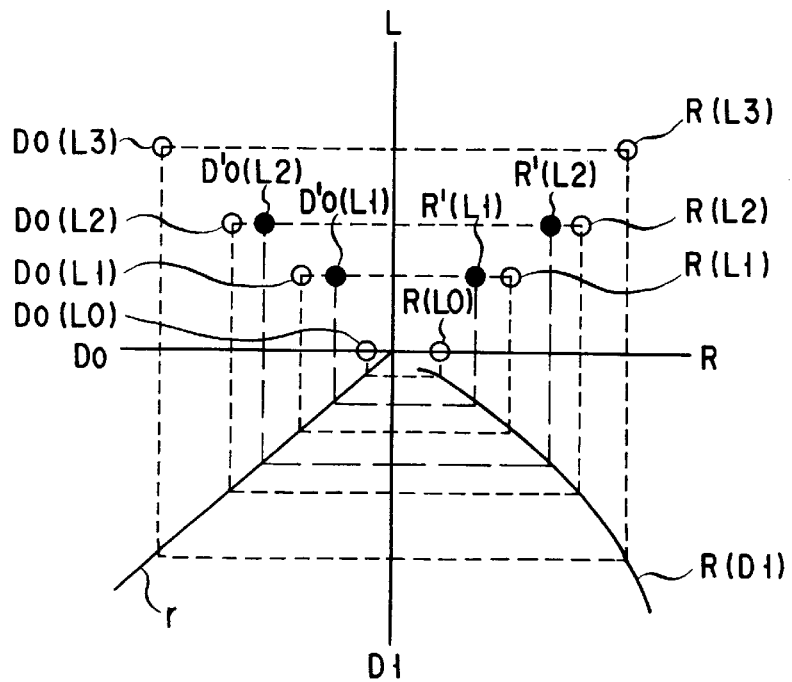

FIG. 11 similarly shows the relationship among the original density Di, reflection factor R, output level L, and output density Do. If the converted multi level signals in the multi level signal conversion means are changed like R'(L1) and R'(L2) in correspondence with the density variations described above, reproducibility of gradation characteristics can be maintained high without varying the gamma characteristics (long dashed lines).

The relationship between the absolute reflection factor Rabs and an absolute reflection density D is expressed by a known equation:

$$D = -\log(Rabs) \qquad (19)$$

Therefore, from equations (19) and (8), a reflection factor R corresponding to the density can be obtained.

R'(L1) and R'(L2) ideally assume levels which can be converted by Di.R characteristics, which do not change over time, if the output pixel densities Do'(L1) and Do'(L2) per pixel are assumed to be input densities Di'(L1) and Di'(L2). Therefore, a level closest to the level at an allowable resolution is set to be a level R.

Figure 12:
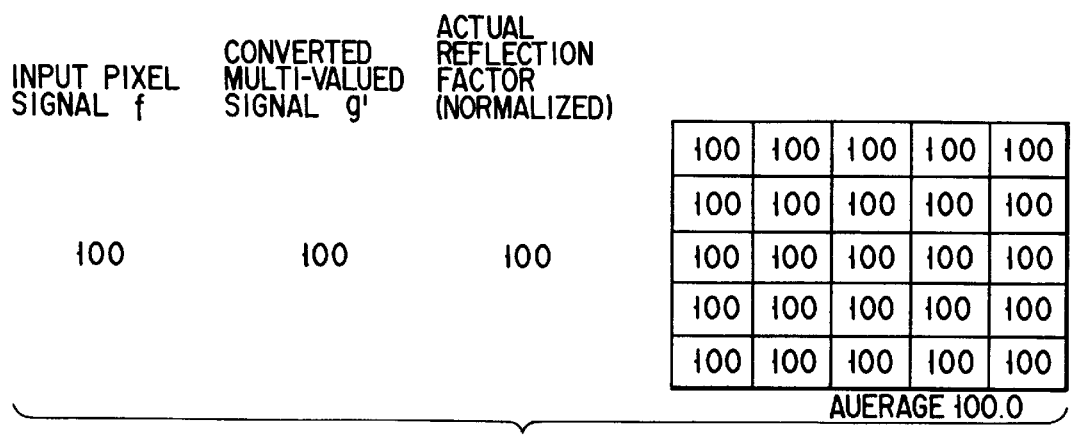
FIGS. 12 to 14 are views showing an example of a converted multi level signal level per pixel, and the reflection factor of a pixel to be actually printed.
Figure 13:
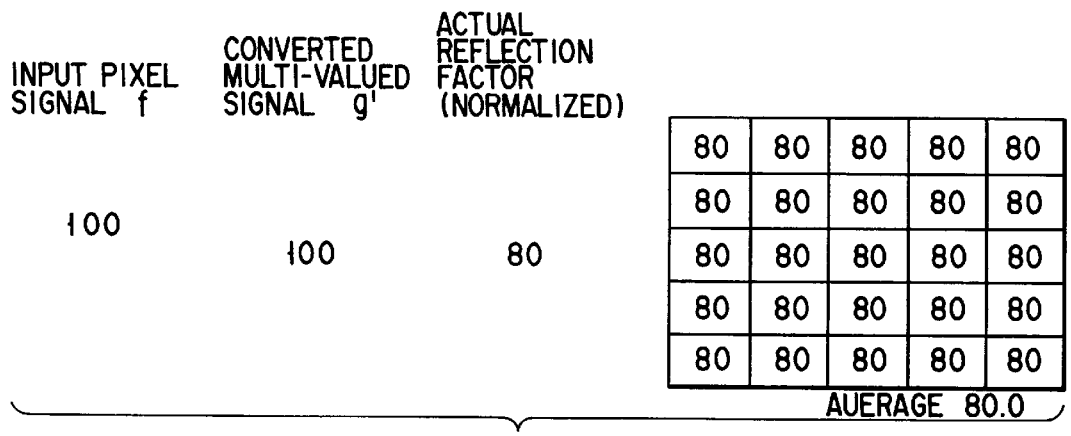
Figure 14:
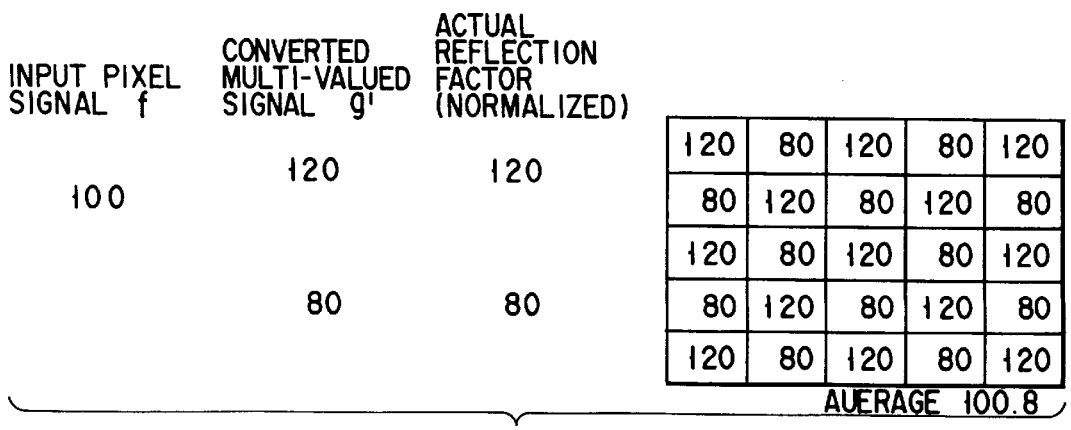

FIGS. 12 to 14 show an example of the converted multi level signal level per pixel and the reflection factor of each pixel to be actually printed. In this example, FIG. 12 shows a case wherein the pre-set converted multi level signal level coincides with the converted level of a density to be actually printed by initial setting, FIG. 13 shows a case wherein the actually printed density varies, and does not coincide with the converted multi level signal level, and FIG. 14 shows a case wherein a converted multi-level signal corresponding to each level of a multi level signal is changed to the converted level of the corresponding varied density. For the sake of simplicity, it is assumed that converted multi level signal levels over the entire area are input to have a level '100', and the initial converted multi level signal level in FIG. 12 is also '100'.

Referring to FIG. 12, the converted level of a density printed at the selected level of a multi level signal corresponding to an input pixel signal similarly becomes '100', and the difference between the input pixel signal and the converted multi level signal, i.e., the multi level error is '0'. Therefore, an error is not diffused, and the density converted level of '100' is uniformly printed. As a result, the average level per pixel is '100', which is equal to the input pixel signal.

In the example shown in FIG. 13 wherein the converted level of the density to be actually printed varies from '100' to '80', since the converted multi-level signal level remains the same as that in FIG. 12 (initially set level), the calculated multi level error is '0'. For this reason, an error is not diffused, and the same multi level signal is uniformly output. However, since the actual density per pixel has varied, the converted levels of the densities of pixels, and their average level become '80'. Thus, in this embodiment, the converted multi level signal level is changed based on the variation.

In FIG. 14, a level '80' equal to the converted level of the density to be actually printed which has varied to '80' is changed in correspondence with a level which was '100'. Similarly, the setting level of a neighboring level (a level higher by one in this case) is also changed under an assumption that the varied density converted level was '120'. Thus, when an input pixel signal '100' is multi-level converted, and the converted multi level signal corresponding to the multi level signal is '120', a multi level error therebetween is '−20', and is diffused to surrounding pixels. For the sake of simplicity, if half the multi level error is distributed to each of a right neighboring pixel of the pixel of interest and a pixel immediately below the pixel of interest, the previous error for the next input pixel signal is '−10', and the corrected error signal is '90'. If the threshold level is '100=(120+80)/2', a level of '80' is selected, the corresponding converted multi level signal is '80', and the multi level error is '−10'. Thus, this error propagates to the subsequent pixels. Upon repetition of this processing, the probability of printing pixels at each of densities of '120' and '80' becomes ½, and the average level per pixel becomes close to the input pixel signal '100'.

More specifically even when the density per pixel varies, the converted multi level signal level is changed in correspondence with the variation state, thereby compensating for an average density (reflection factor) in a local area.

On the other hand, as for the threshold level, in this embodiment, an average level of converted multi level signals corresponding to neighboring levels is used in comparison of multi level signals corresponding to these levels.

$$Th(l)=(Ro(l)+Ro(l+1))/2 \qquad (20)$$

for l=0, 1, 2, . . . , Lmax−1

Lmax; the number of multi level signal levels

This is because if the input pixel signal has a dimension of the reflection factor, and the multi level signal conversion means 12 calculates errors by additions in an identical dimension for converting an input reflection factor into a reflection factor corresponding to an output density per pixel of the output apparatus, the error between the input reflection factor and the output reflection factor corresponding to the multi level can be minimized.

Figure 15:
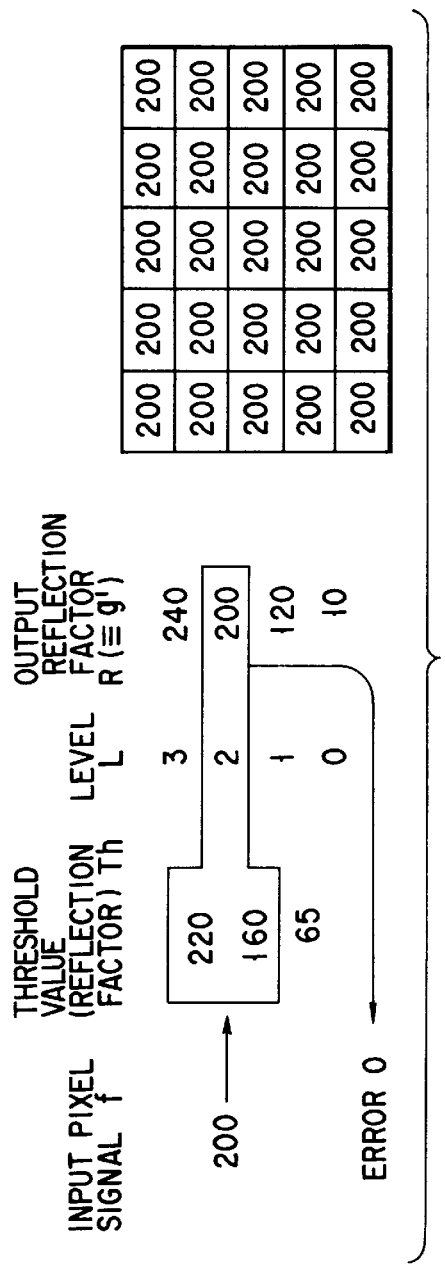
FIGS. 15 and 16 are views showing a difference between reflection factors corresponding to output pixels depending on threshold levels.
Figure 16:
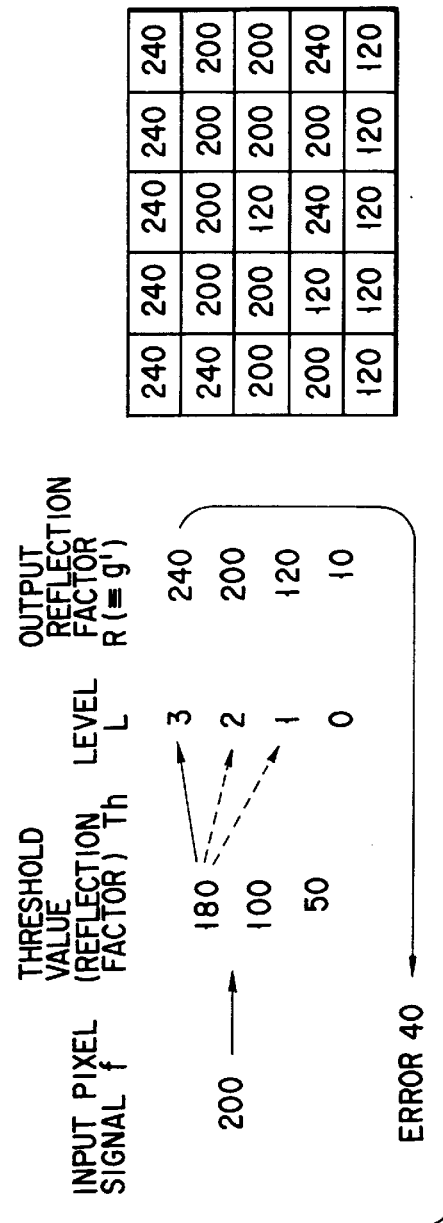

FIGS. 15 and 16 show a difference between the reflection factors corresponding to output pixels depending on threshold levels. In FIG. 15, the threshold level is selected to be an average level of neighboring levels, as described above, and in FIG. 16, the threshold level is arbitrarily selected. The input pixel signal level is set to be '200', which is a level that can be output per pixel.

In FIG. 15, threshold levels '160' and '200' as levels obtained by respectively averaging neighboring levels '240' and '120' and an output level '200' are set. For this reason, when the input is equal to or larger than '160' and equal to or smaller than 220, it is multi-level converted in correspondence with an output level '2', and area printing corresponding to the output level '200' is performed. Therefore, an input level '200' is printed as an output '200', as a matter of course, and all pixels '200' having an error '0' are printed as output levels '200'. In contrast to this, in FIG. 16, although an output level '200' can be printed as in FIG. 15, since threshold levels are arbitrarily selected, the corrected pixel signal fluctuates around 200 by error feedback. For this reason, output levels corresponding to a plurality of levels are undesirably selected.

For this reason, in the case of a uniform density, although the average density (reflection factor) over a wide area has no influence, the area capable of reproducing a desired density increases, and the gradation characteristics of an image having continuous gradation deteriorate, thus impairing resolution characteristics. When the difference between the densities of input neighboring levels is large, a texture may often be generated.

Therefore, when an average level of converted multi level signals corresponding to neighboring levels is set to be a threshold level in correspondence with a converted multi level signal level to be changed, deterioration of the gradation and resolution characteristics can be suppressed.

The operation of this embodiment will be described below with reference to the flow charts in FIGS. 17 to 19.

Figure 17:
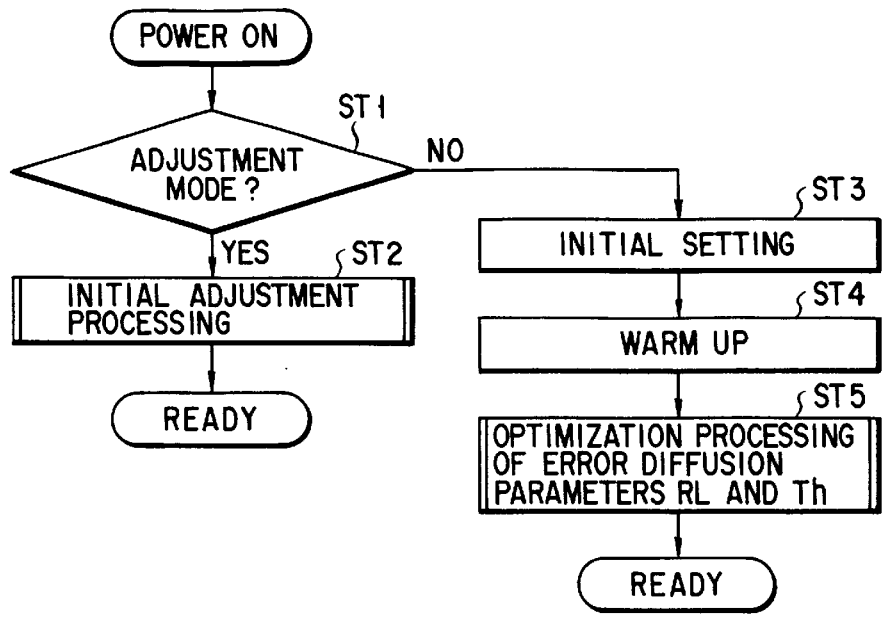

FIG. 17 is a flow chart after the power switch of the image forming apparatus according to the present invention is turned on.

When the power switch is turned on while depressing a predetermined button on a control panel (not shown), the control means 1 determines an adjustment mode (ST1), executes initial adjustment processing (ST2), and is then set in a standby state.

On the other hand, when the power switch is turned on without touching the control panel, the control means 1 sets the threshold levels, which are pre-stored in the current level memory 2d in the nonvolatile memory 2, in the threshold level registers 21a, . . . , sets reflection factors in units of levels in the reflection factor memories 42a, . . . , and sets various parameters in corresponding registers. Also, the control means 1 initializes peripheral devices (ST3).

After a warming-up operation (ST4), error diffusion parameter optimization processing is performed (ST5), and the control means 1 is then set in the standby state.

Figure 18:
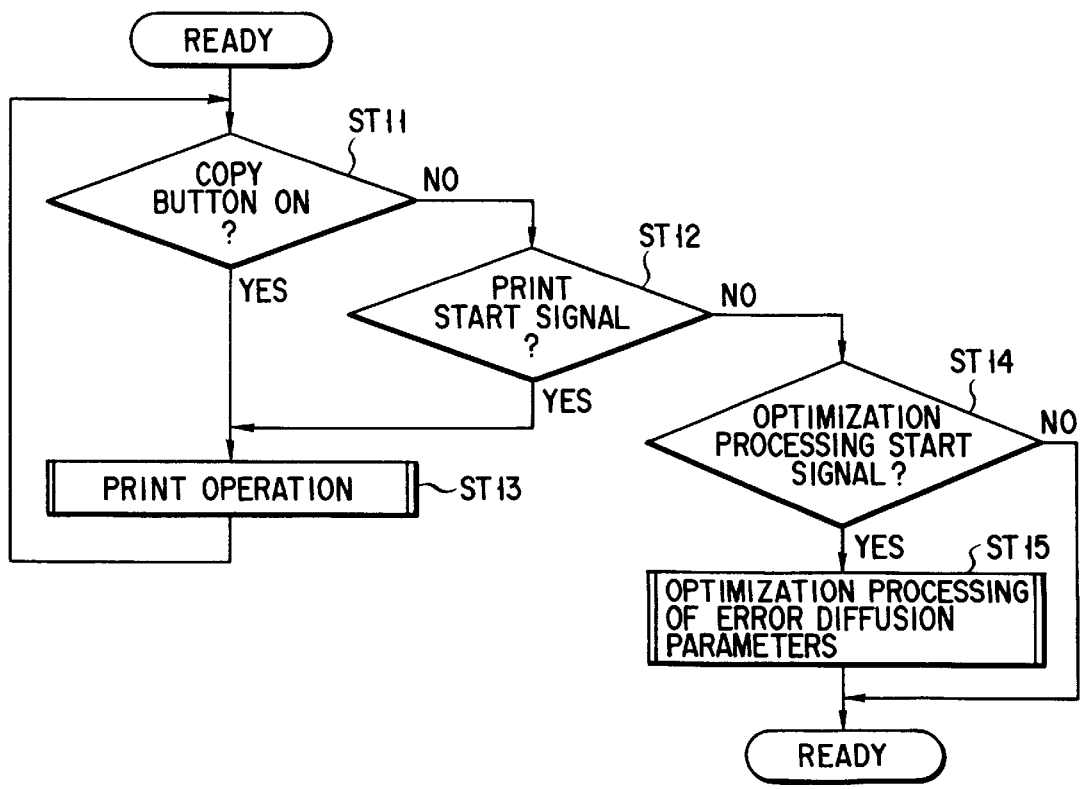
FIG. 18 is a flow chart for explaining processing after the apparatus is ready.
Figure 19:
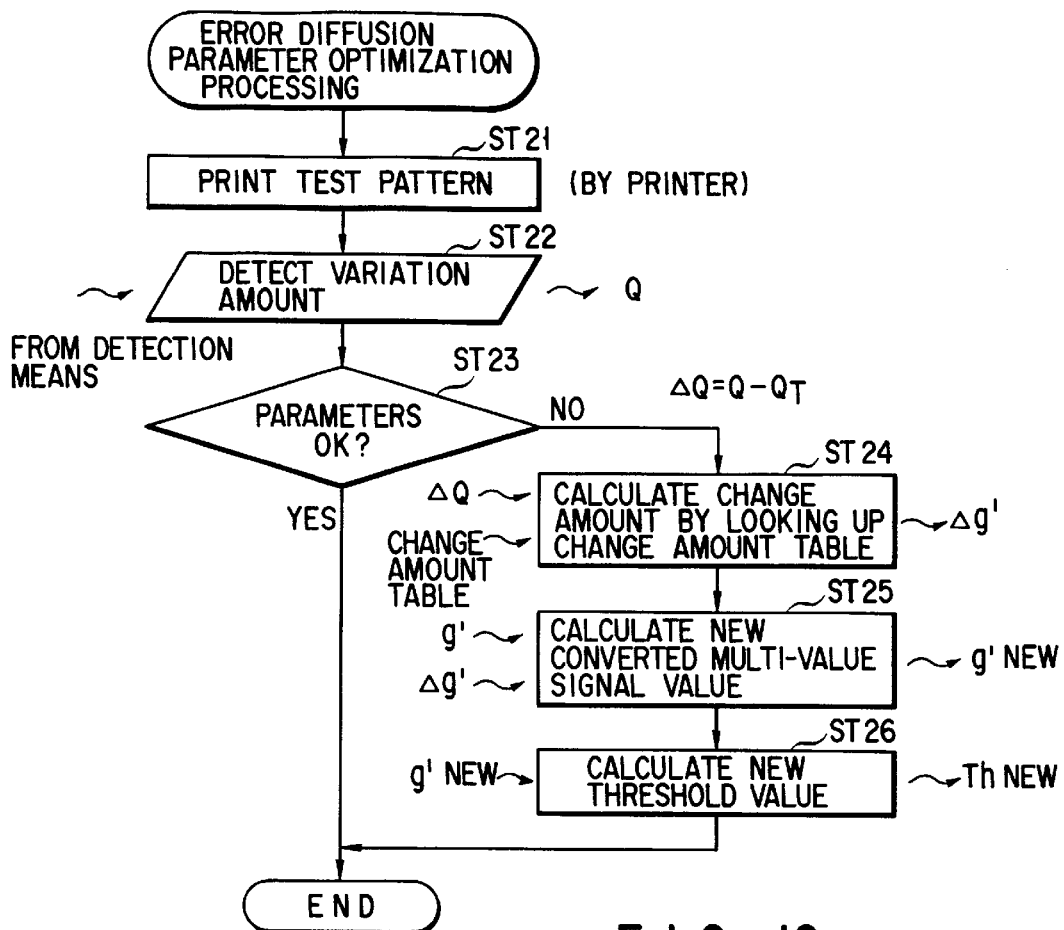
FIG. 19 is a flow chart for explaining error diffusion parameter optimization processing.

FIG. 18 is a flow chart showing processing executed when a copy button on the control panel is depressed or a print start signal is received from an external apparatus in the standby state.

More specifically, when the copy button on the control panel is depressed or a print start signal is received from the external apparatus in the standby state (ST11, ST12), the control means 1 executes image processing using parameters which have already been set, and performs a print operation (ST13). At this time, the error diffusion processing unit 6 performs the above-mentioned error diffusion processing to process data obtained by reading an original or externally input image data, and outputs the processed data to the printer Pr. The printer Pr prints out an image based on the received data.

When a predetermined period of time has lapsed from the end of the previous error diffusion parameter optimization processing, after a print operation of a predetermined number of sheets is performed, or when an external start command signal is input (ST14), the error diffusion parameter optimization processing is executed (ST15). Upon completion of the normal print operation or the error diffusion parameter optimization processing, the control means 1 is set in the standby state again.

The error diffusion parameter optimization processing will be described below with reference to the flow chart shown in FIG. 19.

In the error diffusion parameter optimization processing, the control means 1 discriminates based on a detection signal (an image forming condition variation signal, an image density variation signal, a toner attachment amount variation signal, or the like) from the detection means De whether or not the current converted multi level signal levels stored in the current level memory 2d are to be changed.

More specifically, the control means 1 outputs reflection factor data of a test pattern stored in the test pattern data memory 2a of the nonvolatile memory 2 to the pattern generator 3, and switches the input of the selector 4 to the pattern generator 3 side. Thus, a test pattern pixel signal from the pattern generator 3 is supplied to the correction means 10 in the error diffusion processing unit 6 via the selector 4. In this case, initial levels read out from the initial level memory 2b are stored in the threshold level registers 21a, . . . in the multi-level means 11 and the reflection factor memories 42a, . . . in the multi level signal conversion means 12. Then, a test pattern is printed based on data which is converted into a multi level signal via the same error diffusion processing as described above (ST21).

The control means 1 calculates a variation amount (deviation) ΔQ by comparing a level Q (e.g., a density, a toner attachment amount, or the like) from the detection means De and a level QT (stored in the nonvolatile memory 2) in the initial adjustment processing (ST22), and discriminates whether or not error diffusion parameters are to be changed, by discriminating whether or not the variation amount ΔQ falls outside a control normalized level range stored in the normalized level memory 2e (ST23). If it is determined as a result of the discrimination that the variation amount ΔQ falls within the control normalized level range, the control means 1 ends the initial adjustment processing and is set in the standby state.

On the other hand, if it is determined as a result of the discrimination that the variation amount ΔQ falls outside the control normalized level range (ST23), the control means 1 looks up the multi level signal conversion table 2c to calculate a correction amount Δg' (ST24), and calculates new reflection factor data g' by adding the calculated correction level Δg' to reflection factor data g' as the converted multi level signal level stored in the current level memory 2d (ST25).

The control means 1 calculates an average level of reflection factor data of each two levels of the calculated reflection factor data g' as a new threshold level Thnew (ST26).

In this embodiment, the calculated levels are set in the reflection factor memories 42a, ... in the multi-level signal conversion means 12, and the threshold level registers 21a, ... in the multi-level means 11, and the contents of the current level memory 2d are updated.

Figure 20:
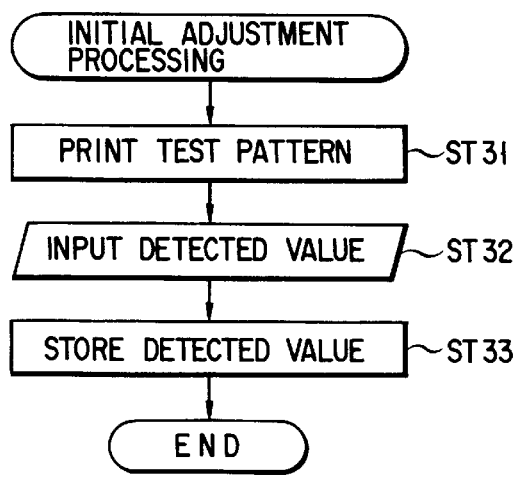
FIG. 20 is a flow chart for explaining initial adjustment processing.

The initial adjustment processing will be described below with reference to the flow chart in FIG. 20.

More specifically, the control means 1 outputs reflection factor data of test patterns corresponding to two densities stored in the test pattern data memory 2a in the nonvolatile memory 2 to the pattern generator 3, and switches the input of the selector 4 to the pattern generator 3 side. Thus, a test pattern pixel signal from the pattern generator 3 is supplied to the correction means 10 in the error diffusion processing unit 6 via the selector. In this case, initial levels read out from the initial level memory 2b are stored in the threshold level registers 21a, ... in the multi-level means 11, and the reflection factor memories 42a, ... in the multi level signal conversion means 12. Then, a test pattern is printed based on data obtained by converting a multi level signal via the same error diffusion processing as described above (ST31).

The control means 1 stores a detection level (target level QT) such as a density, toner attachment amount, or the like from the detection means De such as a toner attachment amount sensor in the nonvolatile memory 2 (ST32, ST33). With this processing, R(L), Th(L), and the like shown in FIGS. 10 and 11 described above are pre-stored in the nonvolatile memory 2.

Referring to FIG. 1, in the normal print operation, the selector 4 selects an input image signal from, e.g., the scanner S, and transfers the selected signal to the correction means 10. A level obtained by distributing errors of surrounding pixels, i.e., a correction amount signal, is added to an input image signal equal to the transferred input image signal, and the corrected pixel signal is transferred to the multi-level means 11 and the error calculation means 13. Then, the corrected pixel signal is multi-level converted on the basis of a threshold level which has already been set, and is transferred to the printer Pr as a multi level image signal.

On the other hand, the multi level signal conversion means 12 outputs a converted multi level signal on the basis of a converted multi level signal level, which corresponds to the output multi level image signal and has already been set, and the output signal is transferred to the error calculation means 13. The error calculation means 13 calculates an error of the converted multi level signal from the above-mentioned corrected pixel signal, and the calculated error is stored in the error memory means 17 for storing errors of the surrounding pixels, via the processing in the error filter means 15 based on the predetermined weighting coefficient pre-stored in the weighting coefficient memory means 16. The above-mentioned operation is repeated for each pixel of interest. During the normal print operation, processing is performed in synchronism with the reading operation of the scanner S or the write cycle of the printer Pr, and the processing speed per pixel can be increased.

Therefore, the selector 4, correction means 10, multi-level means 11, multi level signal conversion means 12, error calculation means 13, error filter means 15, and error memory means 17 perform high-speed operations.

Figure 21:
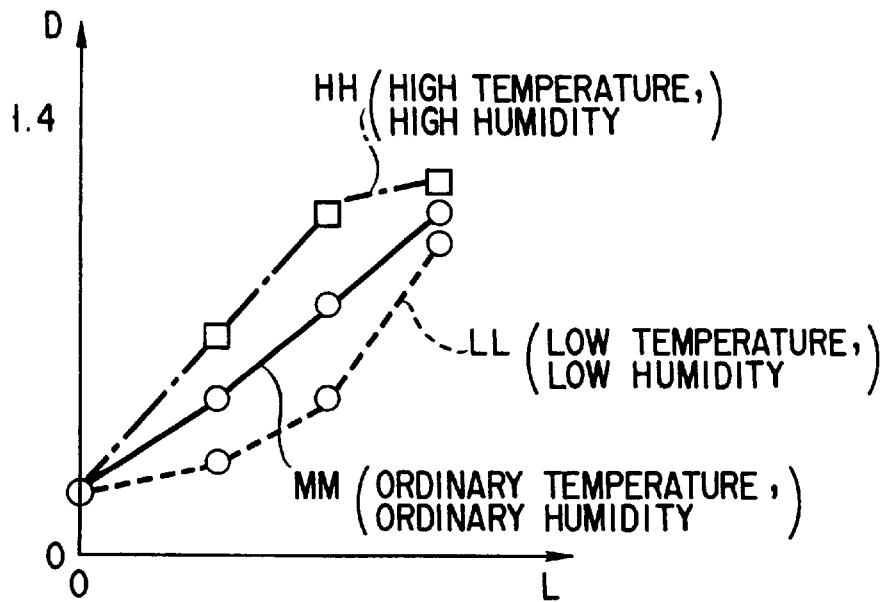
FIG. 21 is a graph showing a change in density per pixel corresponding to a multi level signal level upon changes in temperature and humidity.
Figure 22:
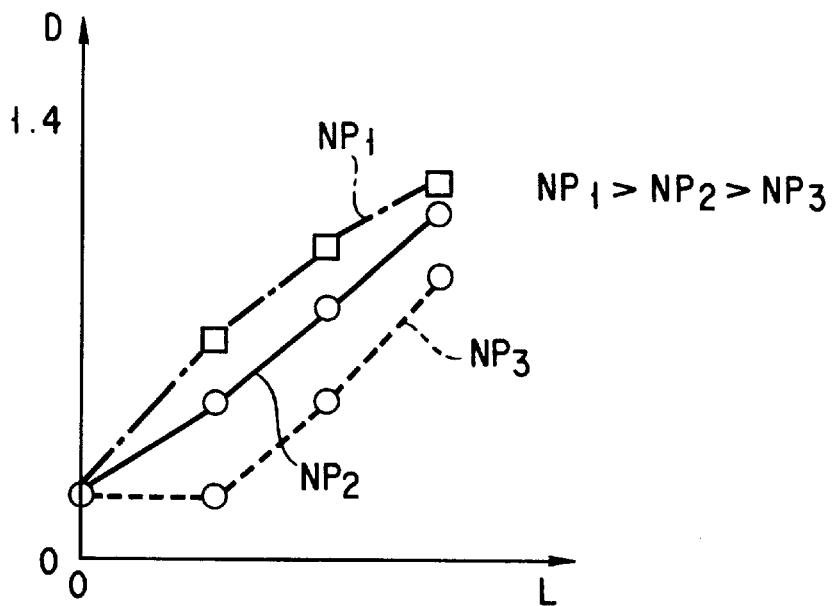
FIG. 22 is a graph showing a change in density per pixel corresponding to a multi level signal level depending on the number of sheets to be printed.

FIGS. 21 and 22 show a change in density per pixel as a function of the multi level signal level due to a change in environment or aging. FIG. 21 shows an example of a change in image density due to a change in environment. In FIG. 21, MM represents densities corresponding to respective levels (the number of levels=4) at ordinary temperature and ordinary humidity, HH represents densities corresponding to the respective levels at high temperature and high humidity, and LL represents densities corresponding to the respective levels at low temperature and low humidity. Changes in minimum and maximum levels are small since the minimum and maximum levels respectively correspond to a non-print area and a density saturated area, but the intermediate densities change under the influence of a change in environment (temperature and humidity). On the other hand, FIG. 22 shows a change in density depending on the number of sheets to be printed. The number of sheets to be printed increases in the order of Np1, Np2, and Np3.

When such a change in density occurs with relatively high reproducibility due to the abovementioned change in environment (temperature or humidity) or aging (the number of sheets to be printed, the operating time, or the number of operating days), or by detecting a density variation itself or detecting an image forming condition variation which causes the variation, as shown in FIG. 17, a change in gradation characteristics in a local area can be minimized, as described above.

A table type correction method adopted in the first embodiment will be described below with reference to FIGS. 23 and 24. Uniform pixel data of a middle density level, e.g., level "1" or "2" in FIG. 17, is printed as a test pattern with reference to the initially adjusted converted multi level signal in the multi level signal conversion means 12 (ST31). The detected density of the output image is read in advance as an initial level (target level) (ST32, ST33) (FIG. 20). In the variation detection step according to the flow chart in FIG. 17 above, the deviation between the read detected level and the above-mentioned initial level is classified into a plurality of stages. In correspondence with this classification, converted level correction levels shown in FIG. 24 corresponding to, e.g., FIG. 23 are prepared in advance in a table (multi level signal conversion table 2c), and the correction levels are added to initial converted multi level signal levels (initial levels of reflection factors in units of levels stored in the initial level memory 2b) of the multi level signal conversion means 12 in correspondence with the respective levels. Corresponding threshold levels are calculated using equation (20) above on the basis of the new converted multi level signal levels, and the converted multi level signal levels (reflection factor data) and threshold levels are respectively stored in the reflection factor memories 42a, . . . in the multi level signal conversion means 12 and the threshold level registers 21a, . . . in the multi-level means 11.

The detection means De of the first embodiment is not limited to the above-mentioned detection means of the output image density, but may comprise a temperature/humidity detection means, a copy counter, a calendar/timer, a head temperature detection means, or the like, as exemplified in FIG. 17, as long as it has correlation with a variation in gradation characteristics.

As described above, according to the first embodiment, even when a variation in gradation characteristics per pixel of an image forming system occurs due to a change in environment, aging, or the like, and furthermore, even when the practical number of gradation levels per pixel decreases due to the variation, the gradation characteristics in a local area can be maintained good. Also, the resolution and the number of levels of an output unit for maintaining the gradation characteristics can be reduced, and the capacity of a high-speed memory for maintaining the good gradation characteristics can also be reduced.

When density gradation characteristics are dominant in gradation expression of an image forming system, error calculations are performed using a dimension of the density, thus allowing accurate gradation characteristic compensation.

Since the threshold levels are changed in correspondence with a change in output level, multi-level processing corresponding to the changed output levels can be realized, and high gradation and resolution characteristics can be maintained.

Since an average of neighboring output levels is set to be a threshold level, the threshold levels of error calculations have the same dimension as those of multi-level conversion. For this reason, when the average levels are set to be threshold levels, the error per pixel can be minimized, and high gradation and resolution characteristics can be maintained.

When a table selection method is adopted as a calculation method of output levels, the change level calculation means can be simplified, an inexpensive apparatus can be provided, and the change level calculation time can be shortened.

The second embodiment will be described below. A scanner S of an input apparatus receives a pixel signal provided in the form of a normalized density signal (to be simply referred to as a density signal hereinafter) which is reflection factor/density-converted by the same means as in the first embodiment or a log conversion means. As an output apparatus such as a printer Pr, an apparatus which reproduces gradation characteristics by intensity modulation like a thermal transfer printer or by density gradation like a silver-chloride photograph is used. When the above-mentioned input apparatus receives an input signal of a reflection factor dimension, the signal is converted into a signal of a density dimension via a predetermined reflection factor/density conversion means, the signal is then converted into a multi level signal, and the multi level signal is transferred to the output apparatus. On the other hand, when the input apparatus receives an input signal of a density dimension, the signal is directly converted into a multi level signal, and the multi level signal is transferred to the output apparatus. The output apparatus performs gradation expression by changing the density per pixel on the basis of the above-mentioned multi level signal.

FIG. 25 is a block diagram of an image processing apparatus according to the second embodiment. Assume that the scanner S receives a signal of a reflection factor dimension given by equation (8) like in the scanner S of the first embodiment. In addition, data corresponding to a density in place of a reflection factor are stored in the nonvolatile memory 2, registers 21a, . . . , and memories 42a, . . . . For example, density data is stored as a converted multi level signal level. Also, the reflection factor memories 42a, . . . are replaced by density memories.

The relationship between the reflection factor and density can be defined by the following principle.

An input pixel signal R (=f) is normalized to [0, 1].

If the normalized reflection factor is represented by Rref in order to distinguish it from R, Rref is given by:

$$Rref = 1 - R/255 \qquad (11)$$

From equations (9) to (11), normalized levels for the white and black reference plates are respectively given by:

$$RW = 0 \rightarrow RrefW = 1 \qquad (12)$$

$$RB = 255 \rightarrow RrefB = 0 \qquad (13)$$

Therefore, Rref given by equation (11) means a relative reflection factor normalized by the reflection factors of the white and black reference plates. original data R after shading correction can be interpreted as a level which is obtained by normalizing Rref to a period [0, 255]. When the densities of the white and black reference plates can be measured, if they are respectively represented by DW and DB, the corresponding converted absolute reflection factors are respectively given by:

$$RW' = 10^{\wedge}(-DW) \qquad (14)$$

$$RB' = 10^{\wedge}(-DB) \qquad (15)$$

Therefore, when the absolute reflection factor is converted from R, we have:

$$R' = Aabs * Rref + Babs \qquad (16)$$

for $$Aabs = (RW' - RB')/(RrefW - RrefB) = (RW' - RB')/(1-0) = RW' - RB' \qquad (17)$$

$$Babs = RB' - Aabs * RrefB = RB' - Aabs * 0 = RB' \qquad (18)$$

From equations (14) to (18), we have:

$$R' = \{10^{\wedge}(-DW) - 10^{\wedge}(-DB)\} * Rref + 10(-DB) \qquad (19)$$

Therefore, if DW and DB are known, a density converted level D' is obtained by the following equation:

$$D' = -\log(R') \qquad (20)$$

From equation (20), the following relationships are established for the white and black reference plates:

$$DW'=-\log(RW') \quad (21)$$

$$DB'=-\log(RB') \quad (22)$$

When D' is normalized by [0, 255], and the normalized level is newly represented by D, we have:

$$D=AD*D'+BD \quad (23)$$

For $$AD=(DB'-DW')/255 \quad (24)$$

$$DB=-AD\ DB' \quad (25)$$

Therefore, in order to normalize the pixel signal R by the densities of the white and black reference plates, a conversion means need only satisfy equations (11) to (23). In this embodiment, density data D corresponding to the pixel signal R is recorded in advance in a read-only high-speed memory to constitute a density conversion means 18 as a look-up table (to be abbreviated as an LUT hereinafter).

In correspondence with this, a converted multi level signal converted by the multi level signal conversion means 12 must have the same dimension as that of the above-mentioned density conversion means 18. More specifically, the output density per pixel to the printer Pr is set corresponding to each level of a multi level signal. Thus, error calculations can be performed in the density dimension. In the second embodiment, reflection factors as the contents of the reflection factor registers 42a, . . . shown in FIG. 9 described in the first embodiment are replaced by densities, and the threshold levels as the contents of the threshold level registers 21a shown in FIG. 5 are set to have the density dimension in place of the reflection factor dimension.

When the gradation characteristics of the output apparatus vary, the multi level signal conversion means changes the output density per pixel corresponding to each level of the varied multi level signal without changing the output from the above-mentioned density conversion means, so that the gradation characteristics in a local area can be maintained good, and can be compensated for by a small rewritable high-speed memory capacity and in a short calculation time.

The third embodiment will be described below.

The third embodiment relates to an image processing apparatus for compensating for gradation characteristics in a local area of an output image corresponding to an input pixel signal when the gradation characteristics of an output apparatus vary, in an image processing system wherein input level signals, corresponding to a relatively small number of levels, from a data generation means such as image formation, editing, recording, transfer of a computer, the input level signals are directly transferred to an output apparatus such as a printer Pr under a predetermined condition, and the printer Pr which prints based on a pixel signal outputs an output image. In this system, the number of levels is the same in the input and output apparatuses.

Figure 26:
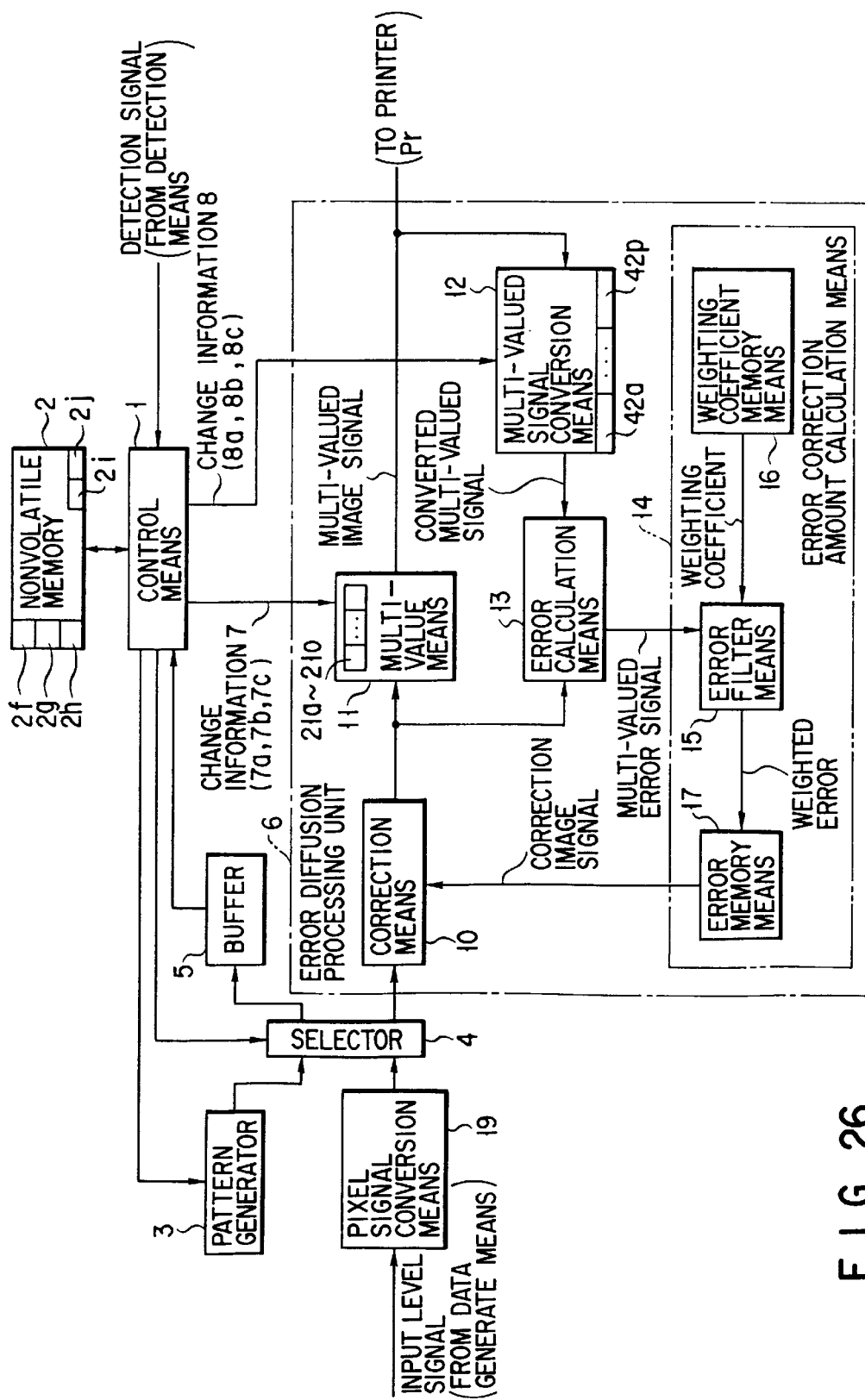
FIG. 26 is a block diagram showing the arrangement of the overall image processing apparatus according to still another embodiment of the present invention.

FIG. 26 is a schematic block diagram of an image processing apparatus of the third embodiment. Assume that the number of levels of input level signals from the above-mentioned data generation means and output level signals to the printer Pr is represented by n (e.g., four levels). A pixel signal conversion means 19 for changing a difference between assignment methods of the input and output level signals is arranged, and a converted multi level signal level in a multi level signal conversion means 12 is set to have the same dimension as that of a level converted by the above-mentioned pixel signal conversion means 19, e.g., a reflection factor dimension. For example, when a predetermined reflection factor obtained by normalizing an input level in correspondence with a level number is defined, the converted level of the multi level signal conversion means 12, which is defined as a reflection factor, is left unchanged. For this reason, reflection factor memories 42a, . . . , of the multi level signal conversion means 12 are realized by a look-up table (LUT). A nonvolatile memory 2 is constituted by a test pattern data memory 2f for storing reflection factor data of test patterns of 16 levels, an initial level memory 2g for storing initial levels of threshold levels to be stored in threshold level registers 21a in a multi-level means 11 (to be described later), and initial levels of reflection factors corresponding to the levels to be stored in the reflection factor memories 42a in the multi level signal conversion means 12, a converted level characteristic table 2h (see FIG. 30) for storing converted multi level signal levels corresponding to output levels as converted levels, a current level memory 2i for storing the threshold levels set in the threshold level registers 21a, . . . in the multi-level means 11, and reflection factors (converted multi level signal levels) corresponding to the levels set in the reflection factor memories 42a, . . . in the multi level signal conversion means 12, and a normalized level memory 2j for storing a control normalized level used for discriminating whether or not the change amount falls within an allowable range.

Therefore, immediately after initial adjustment free from variation in gradation characteristics, defined reflection factor-converted levels of printer output densities corresponding to the levels are equal to the above-mentioned reflection factor converted levels. At this time, levels equal to the reflection factor-converted levels are written as the contents of the multi level signal conversion means. Therefore, when the printer Pr is free from a variation in gradation characteristics, and an output level equal to an input level is output, the error in the reflection factor dimension is 0, and an error diffusion processing unit 6 of the third embodiment does not provide any effect in practice (through pass).

On the other hand, when the gradation characteristics of the printer Pr vary, a variation in density per pixel is detected like in the first embodiment, and the converted multi level signal level, corresponding to each reflection factor-converted output level, in the multi level signal conversion means 12 is rewritten. Thus, the image processing apparatus of this embodiment diffuses the error to surrounding pixels, and the gradation characteristics defined by the input levels in a local area can be maintained.

In the third embodiment, the output apparatus comprises an electrophotography printer Pr which has charging, exposure, development, transfer, and fixing processes as major image forming processes. In this printer Pr, gradation expression is achieved by a pulse-width modulation method for modulating the exposure time per pixel on the basis of the above-mentioned level signal in the exposure process.

FIG. 27 shows an example of detection means. As the detection means, in addition to a toner attachment amount detection means 50d for detecting the attachment amount of a developed toner image, detection means for detecting a change in environment, aging, the output image density, and the like may be adopted. For example, a humidity detection means 50a for detecting the humidity, a temperature detection means 50b for detecting the temperature, an output image density detection means 50c for detecting the output image density, a photosensitive body surface potential detection means 50e for detecting the surface potential of a photosensitive body, a copy counter 50f for counting the number of copies, a calendar/timer 50g for measuring the lapse time, and the like may be adopted. With these means, detected levels associated with a variation in gradation characteristics can be obtained.

Note that the detection signals from the humidity detection means 50a, the temperature detection means 50b, the output image density detection means 50c, the toner attachment amount detection means 50d, and the photosensitive body surface potential detection means 50e are output to a control means 1 via an A/D converter 51, and the count level of the copy counter 50f and the time from the calendar/timer 50g are output to the control means 1 via an I/O.

In this embodiment, a method of changing converted multi level signal levels and threshold levels on the basis of a detection result of the toner attachment amount detection means which can detect data without transferring an image on an actual paper sheet, and has high reproducibility of a correlation to the output density will be described below.

Figure 28:
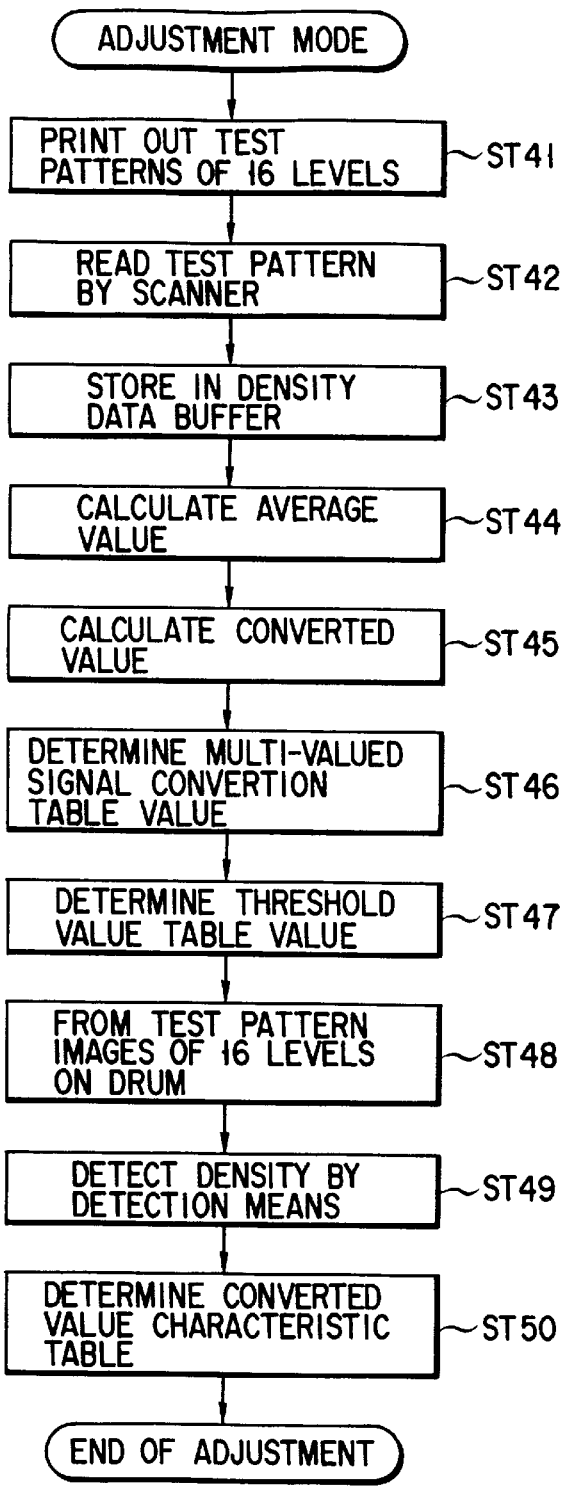
FIG. 28 is a flow chart for explaining initial adjustment processing.

FIG. 28 is a flow chart showing an initial adjustment sequence. An output image printed based on standard pixel data is input using a standard scanner S or calibrator (not shown) (ST41, ST42). The input levels and reflection factors at that time are recorded (ST43). Levels corresponding to each single level are averaged to record an average reflection factor (ST44). This level is converted by a conversion formula based on a predetermined definition, e.g., a converted reflection factor given by equation (16) is calculated for each level (ST45). The converted level is defined as a printer output density (reflection factor) corresponding to each level and is recorded as an initial converted multi level signal level (ST46).

Thereafter, threshold levels are determined. In a system such as an electrophotography system which performs area modulation by exposure but has both area and density gradation expression characteristics, strictly speaking, the output reflection factors and densities may become different from those in an actual local area if only addition/subtractions of reflection factors and densities are used. When a sum total of the reflection factors or densities per pixel coincides with or is close to an actually output reflection factor or density, dimensions suitable for respective error calculations must be selected, and this can be achieved without any problem by using the above-mentioned average level for the threshold level calculation.

However, in the case of area modulation of an electrophotography system, a latent image itself has strong density gradation characteristics in a low density portion, and has strong area gradation characteristics from middle to high density portions Therefore, the converted level may be calculated in a dimension corresponding to the output apparatus. However, processing is complicated very much in this case, and it is difficult to realize it.

Under these circumstances, an actual print operation is performed using an average level of neighboring levels in the above-mentioned converted multi level signals as a converted level, and the dimension of the converted level used is converted into the same dimension as that of a converted level used in error calculations, and the converted level is defined as a threshold level, thus eliminating an error corresponding to each output level even if the gradation expression characteristics are nonlinear (ST47).

Thereafter, test patterns corresponding to the levels (16 levels) are exposed and developed (ST48), and the toner attachment amounts corresponding to the levels are detected (ST49). FIGS. 29 and 30 show an example of converted multi level signal levels g' and toner attachment amounts Q corresponding to the output levels. In FIG. 29, the converted multi level signal levels g' (•) determined in the determination step of the converted level characteristic table 2h corresponding to the output levels, and toner attachment amounts Q (o) obtained by the above-mentioned detection are plotted. Thus, the converted multi level signal levels g' (for 16 levels equal to the number of levels of test patterns) corresponding to the toner attachment amounts Q corresponding to the common output levels are obtained, as shown in FIG. 30. Based on this converted level characteristic table 2h, a converted multi level signal level g' to be changed corresponding to a level of interest can be estimated from a varied toner attachment amount Q'. In this manner, the step of forming a table of converted levels based on the detected levels is executed (ST50), and initial adjustment ends.

Upon execution of the open-loop sequence shown in FIG. 17 based on the table of detected levels/converted multi level signal levels, a converted multi level signal level to be changed can be uniquely obtained from a detected level corresponding to a predetermined test pattern, and the change level calculation time, and hardware or software for calculations can be simplified.

Error diffusion parameter optimization processing will be described below with reference to the flow chart shown in FIG. 31.

In the error diffusion parameter optimization processing, the control means 1 discriminates based on the detection signal from the detection means whether or not the current converted multi level signal levels stored in the current level memory 2i of the nonvolatile memory 2 are to be changed.

More specifically, the control means 1 outputs reflection factor data of test patterns for 16 levels stored in the test pattern data memory 2f of the nonvolatile memory 2 to a pattern generator 3, and switches the input of a selector 4 to the pattern generator 3 side. Thus, a test pattern pixel signal from the pattern generator 3 is supplied to a correction means 10 in the error diffusion processing unit 6 via the selector 4. In this case, initial levels read out from the initial level memory 2g are stored in the threshold level registers 21a, . . . in the multi-level means 11 and the reflection factor memories 42a, . . . in the multi level signal conversion means 12.

The test patterns are printed based on data converted into multi level signals via the same error diffusion processing as described above (ST51).

The control means 1 calculates a variation amount (deviation) ΔQ by comparing a level Q such as a density, a toner attachment amount, or the like from the detection means with a level QT (stored in the nonvolatile memory 2) in initial adjustment processing (ST52), and discriminates whether or not error diffusion parameters are to be changed, by checking whether or not the variation amount ΔQ falls outside a control normalized level range stored in the normalized level memory 2j (ST53). If it is determined as a result of this discrimination that the variation amount ΔQ falls within the control normalized level range, the control means 1 ends initial adjustment processing, and is set in a standby state.

On the other hand, if it is determined as a result of the discrimination (ST53) that the variation amount ΔQ falls outside the control normalized level range, the control means 1 looks up the converted level characteristic table 2h to calculate new reflection factor data g' from the level Q from the detection means (ST54).

The control means 1 calculates an average level of reflection factor data of each two levels of the calculated reflection factor data g' as a new threshold level Thnew (ST55).

In this embodiment, the calculated levels are set in the reflection factor memories 42a, . . . in the multi-level signal conversion means 12, and the threshold level registers 21a, . . . in the multi-level means 11, and the contents of the current level memory 2i are updated.

In the above embodiment, the toner attachment amount is detected following the converted level calculation after the test patterns are printed. When the test patterns are printed, the detection results of the toner attachment amounts of images formed on a photosensitive body may be stored, and converted level characteristic table levels may be determined using the stored toner attachment amounts. Forming processing of the test patterns on the photosensitive body can be omitted.

As described above, even when the gradation characteristics per pixel of an image forming system vary due to a change in environment, aging, or the like, and furthermore, even when the practical number of gradation levels per pixel decreases due to the variation, the gradation characteristics in a local area can be maintained good. Also, the resolution and the number of levels of an output unit for maintaining the gradation characteristics can be reduced, and the capacity of a high-speed memory for maintaining the good gradation characteristics can also be reduced.

Since threshold levels are calculated by actually printing output levels, when gradation expression of an actual image forming system has both density and area gradation characteristics, actually printed densities (reflection factors) are used as threshold levels, thus minimizing the error per pixel, and maintaining high gradation and resolution characteristics.

Since the output level calculation method adopts an open-loop method, the change level calculation amount is small, and the change level calculation time can be shortened. For this reason, an apparatus which can cancel an individual difference of detection means, and has uniform quality can be provided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image processing apparatus comprising:

scanner means for optically reading an image so as to provide a pixel signal, the pixel signal representing a level of reflectance of light read by said scanner means;

first conversion means for converting the pixel signal provided from said scanner means into a multi level signal;

means for forming an image on an image carrier on the basis of the multi level signal converted by said first conversion means, and further forming a test pattern on the image carrier;

second conversion means for converting said converted multi level signal to a reflectance signal representing the level of light reflected by the image formed by the forming means;

first detecting means for detecting an error between the reflectance signal output from the second conversion means and the pixel signal provided by said scanner means and for calculating a correction value on the basis of the detected error, said correction value being used for correcting a following pixel signal output from the scanner means;

means for correcting the following pixel signal provided from said scanner means on the basis of the correction value calculated by said calculating means;

second detecting means for detecting an image density of the test pattern formed on the image carrier by the forming means; and means for changing values to be converted by the second conversion means on the basis of the image density of the test pattern detected by the second detecting means, so as to prevent the image on the image carrier from varying in density in spite of an elapse of time and/or changes in environmental conditions.

2. An apparatus according to claim 1, wherein said forming means comprises exposure means for exposing said image carrier on the basis of the multi level signal so as to form a latent image and means for developing the latent image formed on said image carrier with a developing agent including toner; and said detecting means comprises sensor means for detecting an amount of toner attached to said image carrier by said developing means.

3. An apparatus according to claim 1, wherein said changing means comprises a table for storing a plurality of signal levels for changing the reflectance signal, and reading means for reading out an optimal signal level from said table on the basis of the image density detected by said second detecting means.

4. An apparatus according to claim 1, further comprising first memory means for storing weighing coefficients for pixels in the neighborhood of a pixel represented by said pixel signal provided to said conversion means, filter means for obtaining a weighing error in accordance with the weighing coefficient stored in said first memory means and the error calculated by said first detecting means, and second memory means for storing the weighing error obtained by said filter means so as to correct the pixel signal using the weighing error by said changing means.

5. An image processing apparatus comprising:

means for reading an image so as to provide a pixel signal corresponding to the image;

first conversion means for converting the pixel signal provided by said reading means into a first signal representing a density level of the pixel signal;

second conversion means for converting the first signal converted by said first conversion means into a multi level signal;

means for forming an image on an image carrier on the basis of the multi level signal converted by said second conversion means, and further forming a test pattern on the image carrier;

third conversion means for converting said multi level signal from the second conversion means into a second signal representing a density level corresponding to the image formed by the forming means;

first detecting means for detecting an error between the second signal output from the third conversion means and the pixel signal provided by said reading means and for calculating a correction value on the basis of the detected error, said correction value being used for correcting a following pixel signal output from the reading means;

means for correcting the pixel signal provided from said reading means on the basis of the correction value calculated by said calculating means;

second detecting means for detecting an image density of the test pattern formed on the image carrier by the forming means; and means for changing values to be converted by the third conversion means on the basis of the image density of the test pattern detected by the second detecting means, so as to prevent the image on the image carrier from varying in density in spite of an elapse of time and/or changes in environmental conditions.

6. An apparatus according to claim 5, wherein said forming means comprises exposure means for exposing said image carrier on the basis of the multi level signal so as to form a latent image and means for developing the latent image formed on said image carrier with a developing agent including toner, and said second detecting means comprises sensor means for detecting an amount of toner attached to said image carrier by said developing means.

7. An apparatus according to claim 5, wherein said changing means comprises a table for storing a plurality of signal levels for changing the second signal, and reading means for reading out an optimal signal level from said table on the basis of the image density detected by said second detecting means.

8. An apparatus according to claim 5, further comprising first memory means for storing weighing coefficients for pixels in the neighborhood of a pixel represented by said pixel signal provided to said conversion means, filter means for obtaining a weighing error in accordance with the weighing coefficient stored in said first memory means and the error calculated by said first detecting means, and second memory means for storing the weighing error obtained by said filter means so as to correct the pixel signal using the weighing error by said correcting means.

9. An image processing apparatus comprising:

scanner means for optically reading an image so as to provide a pixel signal, the pixel signal representing a level of reflectance of light read by said scanner means;

first conversion means for converting the pixel signal provided from said scanner means into a multi level signal using predetermined threshold levels;

means for forming an image on an image carrier on the basis of the multi level signal converted by said first conversion means, and further forming a test pattern on the image carrier;

second conversion means for converting said converted multi level signal to a reflectance signal representing the level of light reflected by the image formed by the forming means;

first detecting means for detecting an error between the reflectance signal output from the second conversion means and the pixel signal provided by said scanner means and for calculating a correction value on the basis of the detected error, said correction value being used for correcting a following pixel signal output from the scanner means;

means for correcting the following pixel signal provided from said scanner means on the basis of the correction value calculated by said calculating means;

second detecting means for detecting an image density of the test Pattern formed on the image carrier by the forming means; and means for changing values to be converted by the second conversion means on the basis of the image density of the test pattern detected by the second detecting means, so as to prevent the image on the image carrier from varying in density in spite of an elapse of time and/or changes in environmental conditions, and for changing the threshold levels used by the first conversion means.

10. An apparatus according to claim 9, wherein said forming means comprises exposure means for exposing said image carrier on the basis of the multi level signal so as to form a latent image and means for developing the latent image formed on said image carrier with a developing agent including toner; and said detecting means comprises sensor means for detecting an amount of toner attached to said image carrier by said developing means.

11. An apparatus according to..claim-9, wherein said changing means comprises a table for storing a plurality of signal levels for changing the reflectance signal, and reading means for reading out an optimal signal level from said table on the basis of the image density detected by said detecting means.

12. An apparatus according to claim 9, further comprising first memory means for storing weighting coefficients for pixels in the neighborhood of a pixel represented by said pixel signal provided to said conversion means, filter means for obtaining a weighting error in accordance with the weighting coefficient stored in said first memory means and the error calculated by said calculation means, and second memory means for storing the weighting error obtained by said filter means so as to correct the pixel signal using the weighting error by said correcting means.

13. An image processing apparatus comprising:

means for reading an image so as to provide a pixel signal corresponding to the image;

first conversion means for converting the pixel signal provided by said reading means into a first signal representing a density level of the pixel signal;

second conversion means for converting the first signal converted by said first conversion means into a multi level signal using predetermined threshold levels;

means for forming an image on an image carrier on the basis of the multi level signal converted by said second conversion means, and further forming a test pattern on the image carrier;

third conversion means for converting said multi level signal from the second conversion means into a second signal representing a density level corresponding to the image formed by the forming means;

first detecting means for detecting an error between the second signal output from the third conversion means and the pixel signal provided by said reading means and for calculating a correction value on the basis of the detected error, said correction value being used for correcting a following pixel signal output from the reading means;

means for correcting the pixel signal provided from said reading means on the basis of the correction value calculated by said calculating means;

second detecting means for detecting an image density of the test pattern formed on the image carrier by the forming means; and means for changing values to be converted by the third conversion means on the basis of the image density of the test pattern detected by the second detecting means, so as to Prevent the image on the image carrier from varying in density in spite of an elapse of time and chances in environmental conditions, and for changing the threshold levels used by the second conversion means.

14. An apparatus according to claim 13, wherein
said forming means comprises exposure means for exposing said image carrier on the basis of the multi level signal so as to form a latent image and means for developing the latent image formed on said image carrier with a developing agent including toner; and
said detecting means comprises sensor means for detecting an amount of toner attached to said image carrier by said developing means.

15. An apparatus according to claim 13, wherein said changing means comprises a table for storing a plurality of signed levels for changing the second signal, and reading means for reading out an optimal signal level from said table on the basis of the image density detected by said detecting means.

16. An apparatus according to claim 13, further comprising first memory means for storing weighting coefficients for pixels, filter means for obtaining a weighting error the weighting coefficient stored in said first memory means and the error calculated by said calculation means, and second memory means for storing the weighting error to cause said correction means to correct the pixel signal using the weighting error obtained by said filter means.

17. An image processing apparatus comprising:
scanner means for optically reading an image and supplying a pixel signal, the pixel signal representing a level of reflectance of light constituted by a predetermined number of input levels;
first conversion means for converting the pixel signal provided from said scanner means into a multi level signal made up of a predetermined number of output levels equal to the predetermined number of input levels;
means for forming an image on an image carrier on the basis of the multi level signal converted by said first conversion means, and further forming a test pattern on the image carrier;
second conversion means for converting said converted multi level signal to a reflectance signal representing the level of light reflected by the image formed by the forming means;
first detecting means for detecting an error between the reflectance signal output from the second conversion means and the pixel signal provided by said scanner means and for calculating a correction value on the basis of the detected error, said correction value being used for correcting a following pixel signal output from the scanner means;
means for correcting the following pixel signal provided from said scanner means on the basis of the correction value calculated by said calculating means;
second detecting means for detecting an image density of the test pattern formed on the image carrier by the forming means; and
means for changing values to be converted by the second conversion means on the basis of the image density of the test pattern detected by the second detecting means, so as to prevent the image on the image carrier from varying in density in spite of an elapse of time and changes in environmental conditions.

18. An apparatus according to claim 17, wherein
said forming means comprises exposure means for exposing said image carrier on the basis of the multi level signal so as to form a latent image and means for developing the latent image formed on said image carrier with a developing agent including toner; and
said second detecting means comprises sensor means for detecting an amount of toner attached to said image carrier by said developing means.

19. An apparatus according to claim 17, wherein said changing means comprises a table for storing a plurality of signal levels for changing the reflectance signal, said second detecting means for reading out an optimal signal level from said table on the basis of the image density detected by said detecting means.

20. An apparatus according to claim 17, further comprising first memory means for storing weighting coefficients for pixels, filter means for obtaining a weighting error the weighting coefficient stored in said first memory means and the error calculated by said calculation means, and second memory means for storing the weighting error to cause said correction means to correct the pixel signal using the weighting error obtained by said filter means.

21. An image processing apparatus comprising:
means for supplying a pixel signal representing image density;
means for converting said supplied pixel signal into a multi level signal;
means for forming an image on an image carrier on the basis of the multi level signal converted by said converting means, and further forming a test pattern on the image carrier;
first means for detecting an image density of the image formed on said image carrier by said forming means;
second means for detecting an image density of the test pattern formed on said image carrier by said forming means;
means for changing the multi level signal converted by said converting means in accordance with the image density detected by said second detecting means so as to stabilize the image density changes of the image formed on said image carrier;
means for calculating an error between the level of the multi level signal changed by said changing means and the level of the pixel signal supplied from said supplying means; and
means for correcting a following pixel signal supplied from said supplying means on the basis of the error calculated by said calculating means.

22. An image processing apparatus comprising:
means for supplying a pixel signal representing image density;
means for converting said supplied pixel signal into a multi level signal;
means for forming an image on an image carrier on the basis of the multi level signal converted said converting means;
means for detecting an image forming condition to cause image density changes of the image formed on said image carrier;
means for changing the multi level signal converted said converting means in accordance with the image forming condition detected by said detecting means so as to stabilize the image density changes of the image formed on said image carrier;
means for calculating an error between the level of the multi level signal changed by said changing means and the level of the pixel signal supplied from said supplying means; and
means for correcting a following pixel signal supplied from said supplying means on the basis of the error calculated by said calculating means.

23. An image forming apparatus comprising:

first output means for sequentially outputting first pixel data representing a level of a particular feature of an original image;

first conversion means for converting the first pixel data produced from the first output means into second pixel data;

image forming means, controlled on the basis of the second pixel data produced from the first conversion means, for forming an image;

second conversion means for converting the second pixel data into third pixel data, said third pixel data representing a level of the particular feature of the image formed by the image forming means;

detecting means for detecting an error between the third pixel data output from the second conversion means and the first pixel data, and for calculating a correction value on the basis of the error, said correction value being used for correcting following first pixel data;

correction means for correcting the following first pixel data on the basis of the correction value calculated by the calculating means;

second output means for outputting information regarding variations in the image formed by the image forming means; and changing means for changing values to be converted by the second conversion means on the basis of the information output from the second output means, such that the variations in the image are compensated for.

24. An image forming apparatus comprising:

first output means for sequentially outputting first pixel data representing a level of a particular feature of an original image;

image forming means, controlled on the basis of the first pixel data produced from the first output means, for forming an image;

conversion means for converting the first pixel data into second pixel data representing a level of the particular feature of the image formed by the image forming means;

detecting means for detecting an error between the second pixel data output from the conversion means and the first pixel data, and for calculating a correction value on the basis of the error, said correction value being used for correcting following first pixel data;

correction means for correcting the following first pixel data on the basis of the correction value calculated by the calculating means;

second output means for outputting information regarding variations in the image formed by the image forming means; and changing means for changing values to be converted by the conversion means on the basis of the information output from the second output means, such that the variations in the image are compensated for.

* * * * *